United States Patent
Park et al.

(10) Patent No.: US 10,516,558 B2
(45) Date of Patent: Dec. 24, 2019

(54) TRANSMITTER, RECEIVER, AND WIRELESS COMMUNICATION METHOD THEREOF

(71) Applicant: Samsung Electronics Co., Ltd., Suwon-si (KR)

(72) Inventors: Chang Soon Park, Chungju-si (KR); Young Jun Hong, Seoul (KR); Joon Seong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/807,900

(22) Filed: Nov. 9, 2017

(65) Prior Publication Data

US 2018/0076990 A1    Mar. 15, 2018

Related U.S. Application Data

(62) Division of application No. 14/204,387, filed on Mar. 11, 2014, now Pat. No. 9,847,894.

(30) Foreign Application Priority Data

Jun. 17, 2013    (KR) .................. 10-2013-0069157

(51) Int. Cl.
*H04L 27/22* (2006.01)
*H04L 27/06* (2006.01)

(52) U.S. Cl.
CPC .............. *H04L 27/22* (2013.01); *H04L 27/06* (2013.01)

(58) Field of Classification Search
CPC ....... H04L 27/06; H04L 69/22; H03F 1/0222; H04W 52/0229
See application file for complete search history.

(56) References Cited

U.S. PATENT DOCUMENTS

| | | | |
|---|---|---|---|
| 2,856,530 A | 10/1958 | Watson | |
| 3,868,596 A | 2/1975 | Williford | |
| 4,320,499 A | 3/1982 | Muilwijk et al. | |
| 4,466,108 A | 8/1984 | Rhodes | |
| 4,652,838 A * | 3/1987 | Nossen ............... | H04K 1/006 |
| | | | 342/60 |
| 5,398,034 A | 3/1995 | Spilker, Jr. | |

(Continued)

FOREIGN PATENT DOCUMENTS

| | | | |
|---|---|---|---|
| JP | 2006-517373 A | 7/2006 | |
| JP | 2007-251486 A | 9/2007 | |

(Continued)

OTHER PUBLICATIONS

Korean Office Action dated Jul. 26, 2019 in counterpart Korean Patent Application No. 10-2013-0069157 (2 pages in English and 4 pages in Korean).

*Primary Examiner* — Rahel Guarino
(74) *Attorney, Agent, or Firm* — NSIP Law

(57) ABSTRACT

A transmitter is configured to transmit a radio frequency (RF) signal to a receiver. The receiver is configured to receive the RF signal and decode data. Furthermore, a method of wireless communication is provided between the transmitter and the receiver, in which the transmitter transmits to the receiver the RF signal. A carrier phase of the RF signal is randomly converted. The receiver detects an envelope of the RF signal, and extracts data from the RF signal.

8 Claims, 19 Drawing Sheets

(56) References Cited

U.S. PATENT DOCUMENTS

| | | | |
|---|---|---|---|
| 6,233,290 B1* | 5/2001 | Raphaeli | H03M 13/39 375/262 |
| 6,462,705 B1 | 10/2002 | McEwan | |
| 6,614,837 B1 | 9/2003 | Abdelgany et al. | |
| 7,405,659 B1* | 7/2008 | Hyde | G06K 19/0723 340/10.4 |
| 8,437,384 B2* | 5/2013 | Maguire | H04B 1/38 375/219 |
| 2002/0015436 A1* | 2/2002 | Ovard | G06K 7/0008 375/130 |
| 2004/0156504 A1 | 8/2004 | Mo et al. | |
| 2005/0220172 A1 | 10/2005 | Mo et al. | |
| 2007/0247239 A1 | 10/2007 | Maunuksela et al. | |
| 2009/0129460 A1 | 5/2009 | Nakasha | |
| 2010/0220768 A1* | 9/2010 | Zeng | H03M 13/134 375/141 |
| 2012/0093195 A1 | 4/2012 | Krapf et al. | |

FOREIGN PATENT DOCUMENTS

| | | |
|---|---|---|
| JP | 2007-312371 A | 11/2007 |
| JP | 2008-116952 A | 5/2008 |
| KR | 10-2006-0046063 A | 5/2006 |
| KR | 10-2009-0083442 A | 8/2009 |

* cited by examiner

FIG. 16
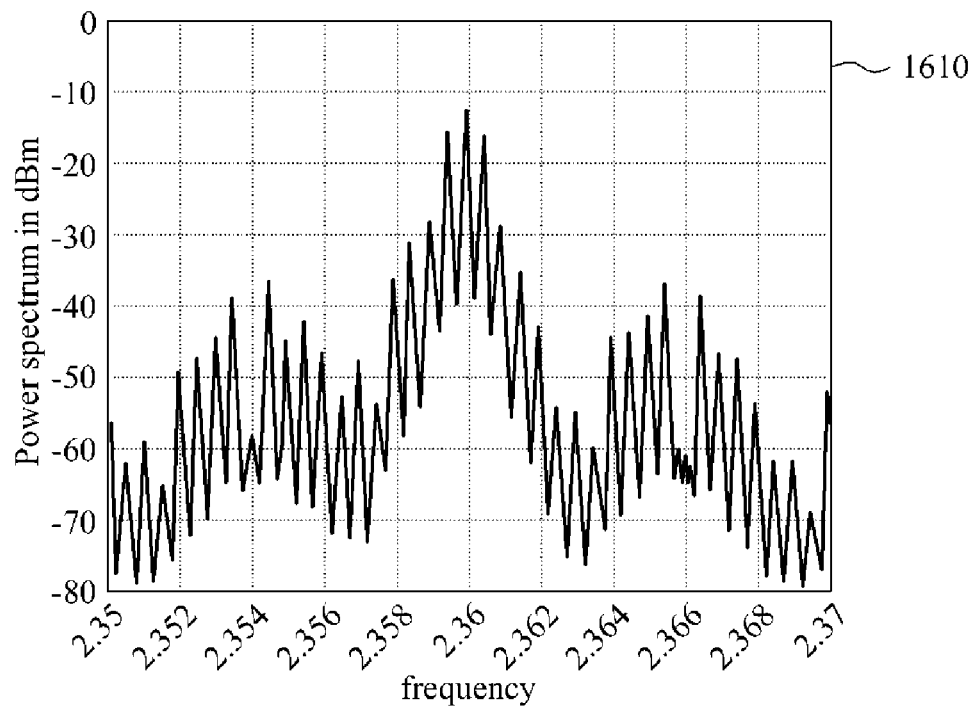
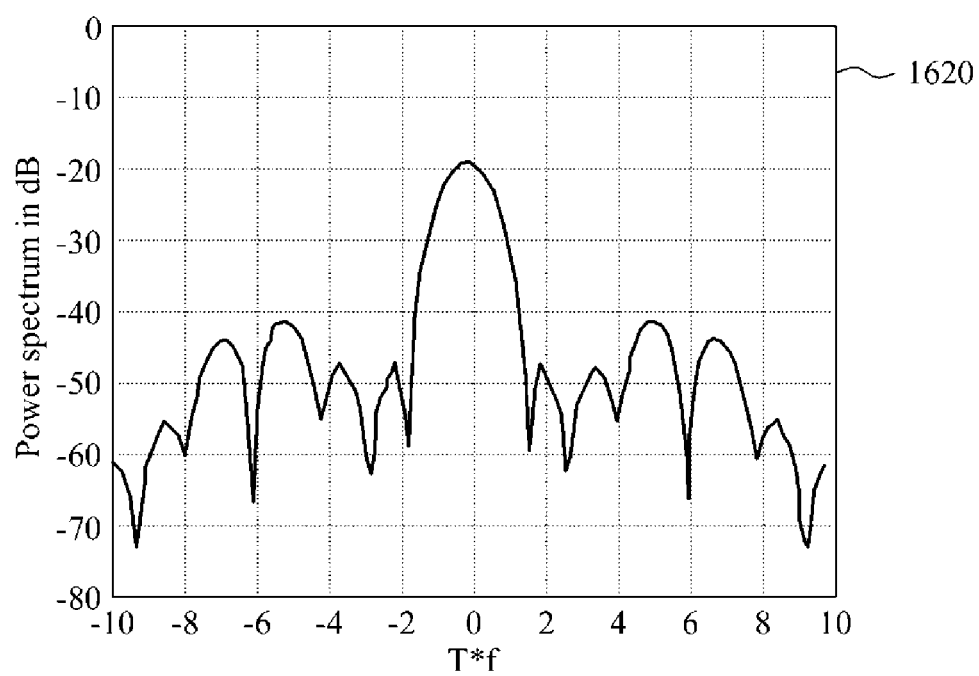

TRANSMITTER, RECEIVER, AND WIRELESS COMMUNICATION METHOD THEREOF

CROSS-REFERENCE TO RELATED APPLICATION

This application is a Divisional of U.S. application Ser. No. 14/204,387, filed on Mar. 11, 2014, which claims the benefit under 35 USC 119(a) of Korean Patent Application No. 10-2013-0069157, filed on Jun. 17, 2013, in the Korean Intellectual Property Office, the entire disclosure of which is incorporated herein by reference for all purposes.

BACKGROUND

1. Field

The following description relates to a transmitter configured to transmit a radio frequency (RF) signal, a receiver configured to receive an RF signal and decode data, the transmitter and the receiver wirelessly communicating, and a wireless communication method thereof.

2. Description of Related Art

With rapid development and commercialization of wireless network technology, use of sensor networks is spreading extensively, and further growth looms for market latency of this technology. In general, a wireless sensor device may be applied for home security, a medical field, mobile healthcare, chemical/biological abnormality monitoring, mechanical disorder/malfunction diagnosis, environmental monitoring, disaster related information sensing, intelligent logistics management, real-time security, and remote monitoring.

A size of sensors in various wireless sensor networks and a local area network (LAN) may be small, while conditions of low power/low complexity may need to be met for the sensors to operate for a long period of time. In particular, a wireless body area network (WBAN) installed in a body and in which wireless communication is performed with a mobile device or another sensor in the body may require relatively more strict conditions in terms of low complexity/low power. To achieve such low power/low complexity conditions, an ultra low power radio frequency (RF) structure may be needed rather than an existing high power RF structure.

A noncoherent modulation scheme, for example, noncoherent on-off keying (OOK), amplitude-shift keying (ASK), and pulse position modulation (PPM), may be deemed appropriate to be applied to a low power/low complexity receiver.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative configuration, there is provided a transmitter including a generator configured to convert input data to a pulse; a converter configured to randomly change a phase of a radio frequency (RF) oscillating signal; and a transmitter configured to convert the pulse to an RF signal based on the RF oscillating signal, and transmit the RF signal to a receiver.

The converter may be configured to randomly reverse a phase of the RF oscillating signal in a time interval determined based on a transmission period of a transmission symbol.

The converter may be configured to randomly change a phase of the RF oscillating signal in a time interval determined based on a transmission period of a transmission symbol to a predetermined value.

The converter may be configured to control an operation of an oscillator outputting the RF oscillating signal, and change the phase of the RF oscillating signal to a continuous phase value.

The converter may be configured to apply a function including a random value in a time interval, which is based on a transmission period of a transmission symbol, to the RF oscillating signal and change the phase of the RF oscillating signal.

The converter may be configured to determine change periods of the phase corresponding to a positive integer multiple of a transmission period of a transmission symbol, and randomly change the phase of the RF oscillating signal for the change periods.

The transmitter may be configured to transmit the RF signal to the receiver to decode data based on an envelope of the received RF signal.

The transmitter may be configured to transmit the RF signal to the receiver to decode data without using carrier phase information of the RF signal.

The generator includes a data encoder configured to map input data to an element set; and a pulse shaper configured to generate the pulse corresponding to the data based on a result of the mapping.

The pulse shaper may be configured to overlap pulses corresponding to a data sequence on a time axis, and convert the data sequence to a pulse series.

The pulse shaper may be configured to adjust a shape of each pulse to avoid distortion of a transmission waveform in a limited bandwidth while transmitting the transmission waveform corresponding to a transmission bit.

In accordance with another illustrative configuration, there is provided a transmitter including a data encoder configured to output a quantized result indicative of mapping input data to an element set; a converter configured to randomly change a code of the quantized result and output an output signal indicative thereof; a pulse shaper configured to convert the output signal to a form of a pulse; and a transmitter configured to convert the pulse to an RF signal based on an RF oscillating signal and transmit the RF signal to a receiver.

The converter may be configured to randomly change the code to a negative code in a time interval determined based on a transmission period of a transmission symbol.

The converter may be configured to apply a function including a random value in a time interval, which is based on a transmission period of a transmission symbol, to the quantized result and change the code and a size of the quantized result.

The converter may be configured to randomly change the code of the quantized result at points of time corresponding to positive integer multiples of the transmission period.

The data encoder includes an encoder configured to perform encoding by including an error correction code in the input data, a spreader configured to apply a spreading code sequence to the encoded input data, and a symbol mapping unit configured to map a symbol with the encoded input data to which the spreading code sequence is applied.

The transmitter may also include a mixer configured to generate the RF signal corresponding to the input data by multiplying the RF oscillating signal and a pulse series of a low frequency band.

In accordance with an illustrative example, there is provided a receiver including an envelope detector configured to detect an envelope of a radio frequency (RF) signal; and a data decoder configured to decode data based on the envelope of the RF signal, wherein the RF signal comprises a randomly changed carrier phase.

The RF signal may be configured to correspond to an RF signal with a carrier phase randomly reversed in a time interval determined based on a transmission period of a transmission symbol.

The RF signal may be configured to correspond to an RF signal with a carrier phase randomly changed to a predetermined value in a time interval determined based on a transmission period of a transmission symbol.

The RF signal may be configured to correspond to an RF signal with a carrier phase randomly changed to a continuous phase value.

In accordance with an illustrative configuration, there is provided a method of wireless communication at a transmitter, including converting input data to a pulse; randomly changing a phase of a radio frequency (RF) oscillating signal; converting the pulse to an RF signal based on an RF oscillating signal; and transmitting the RF signal to a receiver.

In accordance with an illustrative configuration, there is provided a method of wireless communication, including receiving a radio frequency (RF) signal from a transmitter; detecting an envelope of the RF signal; and decoding data based on the envelope of the RF signal, wherein the RF signal comprises a randomly changed carrier phase.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which:

FIGS. 15 and 16 are graphs illustrating examples of a simulation result of comparing efficiency of an existing method of wireless communication and efficiency of a proposed method of wireless communication, in accord with an illustrative configuration.

Figure 1:
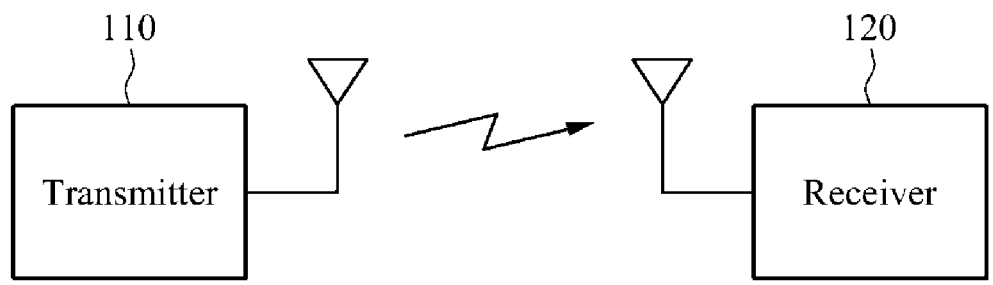
FIG. 1 is a diagram illustrating an example of a method of wireless communication between a transmitter and a receiver, in accord with an illustrative configuration.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an example of a method of wireless communication between a transmitter 110 and a receiver 120, in accord with an illustrative configuration.

In one example, the transmitter 110 and the receiver 120 perform wireless communication, based on a noncoherent modulation/demodulation scheme. The noncoherent modulation/demodulation scheme refers to a scheme in which, unlike a coherent modulation/demodulation scheme, a receiver decodes data without using carrier phase information in a transmitter. For example, the transmitter 110 and the receiver 120 communicate using the noncoherent modulation/demodulation scheme, such as noncoherent on-off keying (OOK), to determine a presence of a signal by detecting an envelope or amplitude-shift keying (ASK). Unlike the coherent modulation/demodulation scheme, the noncoherent modulation/demodulation scheme provides a communication environment of low power/low complexity because elements requiring a high cost synchronization process to obtain a carrier phase value, or requiring high power, such as a mixer or a linear amplifier, are not used.

The transmitter 110 converts data to be transmitted to the receiver 120 to a form of a radio frequency (RF) signal, and transmits the converted data to the receiver 120. The transmitter 110 transmits data, using an RF signal of which a carrier phase is randomly changed. The transmitter 110 randomly generates a carrier phase, applies the randomly generated carrier phase to an RF oscillating signal, for example, an output signal of an RF oscillator, and generates an RF signal of which a carrier phase is randomly changed. In one illustrative example, the carrier phase information of the RF signal bears no relevance to a transmission symbol, and is not transmitted to the receiver 120. Also, the transmitter 110 converts a sign of a baseband signal differently in a predetermined time interval or an arbitrary time interval, applies the converted code to the RF oscillating signal, and generates an RF signal in a form similar to a form of the RF signal of which the carrier phase is randomly changed.

The receiver 120 receives an RF signal from the transmitter 110, and decodes data from the RF signal. The receiver 120 detects an envelope of the RF signal, and extracts data from the RF signal based on the detected envelope. The receiver 120 decodes data from the detection of the envelope, and estimates a transmission symbol without using information associated with a random carrier phase used in the transmitter 110.

The transmitter 110 transmits data through the RF signal of which the carrier phase is randomly changed, or an RF signal in a similar form, and prevents an occurrence of a line spectrum in which power density is relatively concentrated at a predetermined frequency. The line spectrum may occur due to power concentration through reinforcing interference at a predetermined frequency of a frequency area.

As the line spectrum is removed, a system for wireless communication including the transmitter 110 and the receiver 120 effectively reduce power and absolute magnitude of power, defined in a power spectral density (PSD) mask of a communication protocol. In one example, conditions of power reduction may refer to a limit in magnitude reduction of power, relative to a center frequency, and in a frequency interval adjacent to the center frequency. The conditions of absolute magnitude of power may also refer to conditions with an absolute magnitude of power to be satisfied in a frequency interval adjacent to the center frequency. Also, as the line spectrum is removed, the system for wireless communication may provide a power spectrum suitable for various transmission symbol sequence patterns, and enable the receiver 120 to have a stable reception. Further, the system for wireless communication may prevent performance degradation of a circuit in which power density is concentrated in a center frequency. When the power density is concentrated at the center frequency, a direct current (DC) offset component is relatively high, and the performance of a circuit may deteriorate because a probability of saturation may increase during a signal amplifying process.

Figure 2:
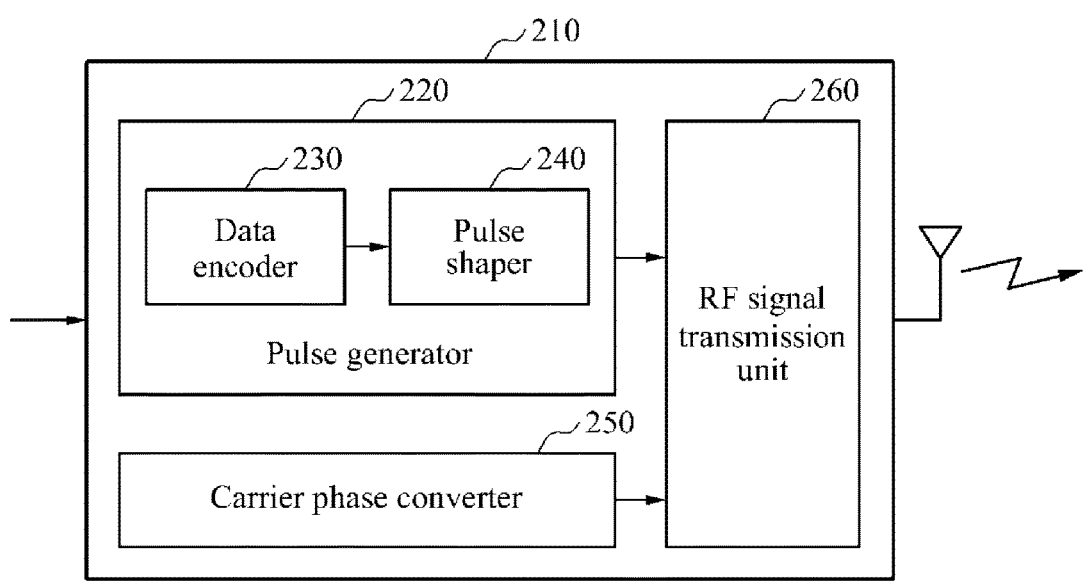
FIG. 2 is a diagram illustrating an example of a configuration of a transmitter, in accord with an illustrative configuration.

FIG. 2 illustrates an example of a configuration of a transmitter 210, in accordance with an illustrative configuration.

Referring to FIG. 2, the transmitter 210 includes a pulse generator 220, a carrier phase converter 250, and an RF signal transmission unit 260. The pulse generator 220 includes a data encoder 230 and a pulse shaper 240.

The pulse generator 220 converts data to generate a pulse. In other words, the pulse generator 220 converts data to a discrete element, and generates a pulse corresponding to the discrete element. The pulse generator 220 outputs a pulse sequence in which a plurality of pulses overlaps. For example, when the pulse generator 220 is assumed to use the noncoherent OOK scheme, a pulse in a predetermined shape may be generated when a binary symbol to be transmitted is "1". In the alternative, the pulse generator 220 may not generate a pulse when a binary symbol to be transmitted is "0".

The data encoder 230 encodes input data or a data sequence to be transmitted in a form of a transmission bit. The data encoder 230 maps the input data or the data sequence to a predetermined element set. For example, the predetermined element set may be configured by "0" and predetermined positive numbers greater than "0". When the element set is configured to be {0, 1}, the data encoder 230 encodes input data through mapping the input data to "0" or "1" as a binary encoder of the noncoherent OOK scheme. The data encoder 230 maps the input data to a predetermined element set and outputs a quantized result.

In transmitting multi-bits per transmission a symbol, for example, in a case of the ASK in which 2 bits are transmitted per transmission of a symbol, the data encoder 230 groups an input data sequence into two bits, and maps the input data sequence to one of four levels "0", "1", "2", and "3".

The pulse shaper 240 generates a pulse corresponding to the input data based on a result of the mapping of the data encoder 230. The pulse shaper 240 multiplies an output value of the data encoder 230 with a predetermined pulse shape and generates a pulse corresponding to the data input. The pulse shaper 240 overlaps pulses corresponding to the data sequence on a time axis, and converts the data sequence to a form of a pulse series. The pulse shaper 240 adjusts a shape of a pulse to avoid distortion of a transmission waveform in a limited bandwidth while transmitting the transmission waveform corresponding to a predetermined transmission bit.

The transmitter 210 further includes a voltage-controlled oscillator (VCO) generating an RF oscillating signal. The VCO outputs the RF oscillating signal corresponding to a carrier frequency.

The carrier phase converter 250 randomly changes a phase of the RF oscillating signal. The carrier phase converter 250 generates a random carrier phase, applies the generated carrier phase to the RF oscillating signal, and randomly changes the phase of the RF oscillating signal. The carrier phase converter 250 applies a function having a random value in a time interval determined based on a transmission period of a transmission symbol, and changes the phase of the RF oscillating signal. In one example, a length of the time interval determined based on the transmission period of the transmission symbol has a length being a positive integer, multiple of the transmission period of the transmission symbol. Also, the carrier phase converter 250 changes the phase of the RF oscillating signal using various functions.

The carrier phase converter 250 shifts the phase of the RF oscillating signal in the time interval determined based on the transmission period of the transmission symbol. For example, the carrier phase converter 250 applies a function having a value of "+1" or "−1" in the time interval determined in the transmission period of the transmission symbol, and reverses the phase of the RF oscillating signal in a time interval randomly determined. The carrier phase converter 250 changes the phase of the RF oscillating signal to a predetermined value in the time interval determined in the transmission period of the transmission symbol. For example, the carrier phase converter 250 changes the phase of the RF oscillating signal to one of four predetermined phase values, $\pi/4$, $3\pi/4$, $5\pi/4$, and $7\pi/4$, using two different functions having values of "+$1/\sqrt{2}$" or "−$1/\sqrt{2}$" in the time interval determined in the transmission period of the transmission symbol.

The carrier phase converter 250 controls an operation of an oscillator to output the RF oscillating signal, and randomly changes the phase of the RF oscillating signal to a continuous phase value. In one example, the carrier phase converter 250 changes the phase of the RF oscillating signal to a predetermined value in a range of "0" degree to "360" degrees for respective predetermined periods. For example, the carrier phase converter 250 turns off/turns on the VCO per predetermined period, and randomly changes the phase of the RF oscillating signal to a continuous phase value in a range of "0" degree to "360" degrees.

The carrier phase converter 250 determines a change period of a phase corresponding to positive integer multiples of the transmission period of the transmission symbol, and randomly changes the phase of the RF oscillating signal per determined change period. For example, when a positive integer K=1, the carrier phase converter 250 generates a random carrier phase, irrespective of the transmission symbol per transmission of the transmission symbol, and applies the generated random carrier phase to the phase of the RF oscillating signal, or a carrier.

The carrier phase converter 250 applies a random phase to the RF oscillating signal, and prevents concentration of power density from occurring in a predetermined frequency due to reinforcing interference of a frequency. Also, the carrier phase converter 250 applies a random phase to the RF oscillating signal, and removes a DC offset component of an RF signal to be transmitted.

The RF signal transmission unit 260 converts a pulse to an RF signal based on an RF oscillating signal from which a phase is converted. The RF signal transmission unit 260 includes a mixer (not shown) to multiply an RF oscillating signal to which a random carrier phase is applied and a low frequency signal output by the pulse shaper 240. The RF signal transmission unit 260 generates an RF signal through the mixer. The generated RF signal may be wirelessly transmitted through a power amplifier (not shown).

According to another example, the RF signal transmission unit 260 generates an RF signal using the power amplifier instead of the mixer. The RF signal transmission unit 260 receives the RF oscillating signal to which the random carrier phase is applied and the low frequency signal output from the pulse shaper 240. The RF signal transmission unit 260 then applies the RF oscillating signal and the low frequency signal to the power amplifier. The RF signal transmission unit 260 generates the RF signal without using the mixer. In a case in which the RF signal is generated without using the mixer, the RF signal is generated using low power.

The receiver decodes data based on an envelope of a received RF signal. The RF signal transmission unit 260 may not need to transmit carrier phase information to the receiver because the receiver may decode data without using the carrier phase information of the received RF signal. For example, when a system for wireless communication between the transmitter 210 and the receiver is assumed to be a spread spectrum system that multiplies a spreading code sequence when transmitting bit information, carrier related information generated by a transmission symbol may bear no relevance to the spreading code sequence, which is mutually shared between the transmitter 210 and the receiver. During a process in which the receiver detects an envelope, an irregular signal of the random carrier phase may disappear.

Figure 3:
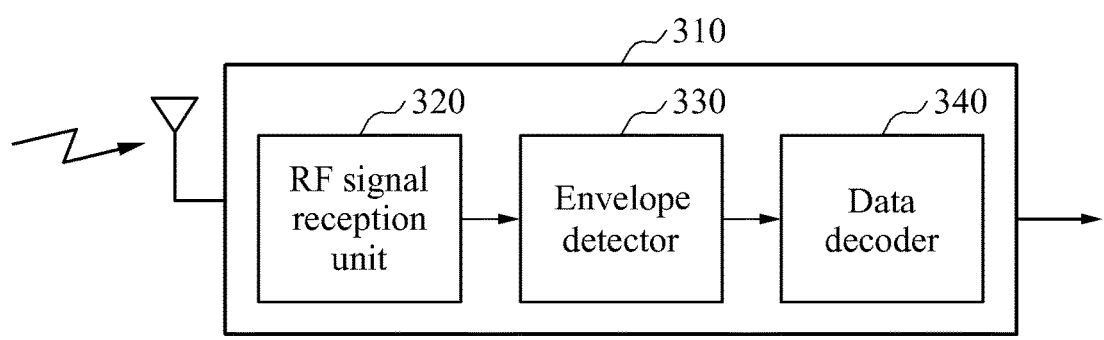
FIG. 3 is a diagram illustrating an example of a configuration of a receiver, in accord with an illustrative configuration.

FIG. 3 illustrates an example of a configuration of a receiver 310, in accord with an illustrative configuration.

Referring to FIG. 3, the receiver 310 includes an RF signal reception unit 320, an envelope detector 330, and a data decoder 340.

The RF signal reception unit 320 receives the RF signal from a transmitter. The RF signal has a carrier phase randomly changed by the transmitter. For example, the RF signal refers to an RF signal with a carrier phase randomly reversed in a time interval determined based on a transmission period of a transmission symbol, or an RF signal with a carrier phase randomly changed to a predetermined value in the time interval determined based on the transmission period of the transmission symbol. The RF signal may also refer to an RF signal with a carrier phase randomly changed to a continuous phase value.

The envelope detector 330 detects an envelope from the received RF signal. In one example, during a process in which the envelope detector 330 detects the envelope, an irregular signal of a random carrier phase disappears.

The data decoder 340 decodes data based on the envelope of the RF signal. For example, the data decoder 340 detects an envelope from an RF signal, and performs sampling on an envelope pattern to convert the envelope pattern from an analog signal to a digital signal. The data decoder 340 extracts data using an envelope, and estimates a transmission symbol without using carrier phase information of the RF signal.

Figure 4:
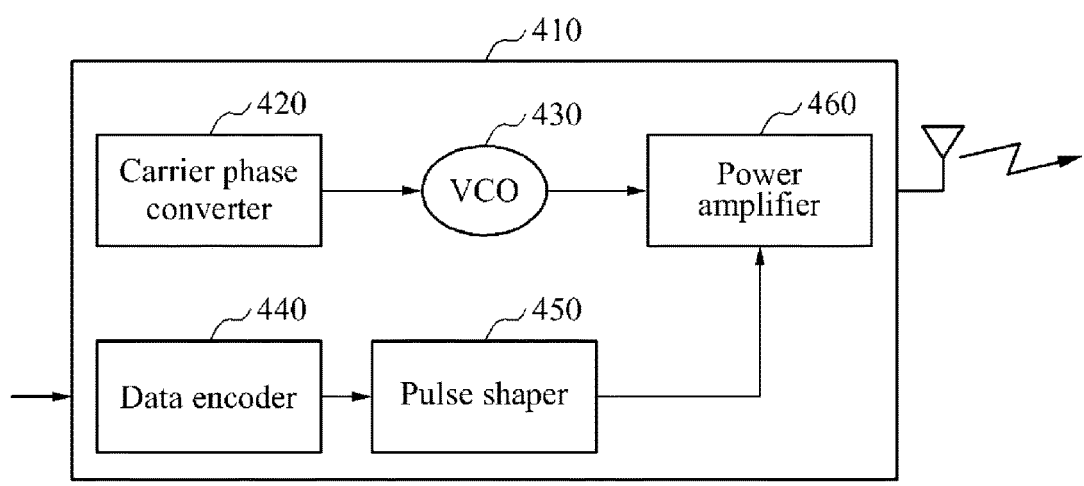
FIG. 4 is a diagram illustrating an example of an operation to transmit a radio frequency (RF) signal based on a method to convert a carrier phase, in accord with an illustrative configuration.

FIG. 4 illustrates an example of an operation to transmit an RF signal based on a method to convert a carrier phase, in accord with an illustrative configuration.

In one illustrative example, a transmitter 410 illustrated in FIG. 4 corresponds to the example of the transmitter 210 of FIG. 2. Accordingly, for any descriptions omitted in FIG. 4, reference may be made to FIG. 2.

Referring to FIG. 4, the transmitter 410 includes a data encoder 440, a pulse shaper 450, a carrier phase converter 420, a VCO 430, and a power amplifier 460.

The data encoder 440 encodes data to be transmitted in a form of a transmission bit. The data encoder 440 maps input data, or a data sequence, to a predetermined element set.

The pulse shaper 450 generates a pulse corresponding to the data input based on a result of the mapping performed by the data encoder 440. The pulse shaper 450 multiplies an output value of the data encoder 440 and a predetermined pulse shape, and generates a pulse corresponding to the data. The pulse shaper 450 overlaps pulses corresponding to a data sequence on a time axis, and converts the data sequence to a form of a pulse series.

The carrier phase converter 420 generates a function to randomly change a phase of an RF oscillating signal. The carrier phase converter 420 generates a random carrier phase, and provides the generated carrier phase to the VCO 430 to generate an RF oscillating signal. The carrier phase converter 420 generates at least one function having a predetermined value randomly determined, in a time interval determined based on the transmission period of a transmission symbol. For example, the carrier phase converter 420 generates two different functions having "+1/$\sqrt{2}$" or "−1/$\sqrt{2}$" in the time interval determined based on the transmission period of the transmission symbol.

The at least one function provided to the VCO 430 may be applied to the RF oscillating signal generated in the VCO 430, and the phase of the RF oscillating signal may be randomly changed. The phase of the RF oscillating signal may be randomly changed at a predetermined time interval and based on the function generated by the carrier phase converter 420.

The carrier phase converter 420 generates a signal to control an operation of the VCO 430, and provides the generated signal to the VCO 430. For example, the carrier phase converter 420 generates a control signal to turn on and off the VCO 430 per predetermined period, and provides the generated control signal to the VCO 430. The RF oscillating signal is output from the VCO 430 in response to the control signal, which may have a phase randomly selected in a range of 0 degrees to 360 degrees.

The power amplifier 460 generates an RF signal by inputting an RF oscillating signal with a phase randomly changed and a low frequency signal, which is output from the pulse shaper 450, and wirelessly transmits the generated RF signal.

Figure 5:
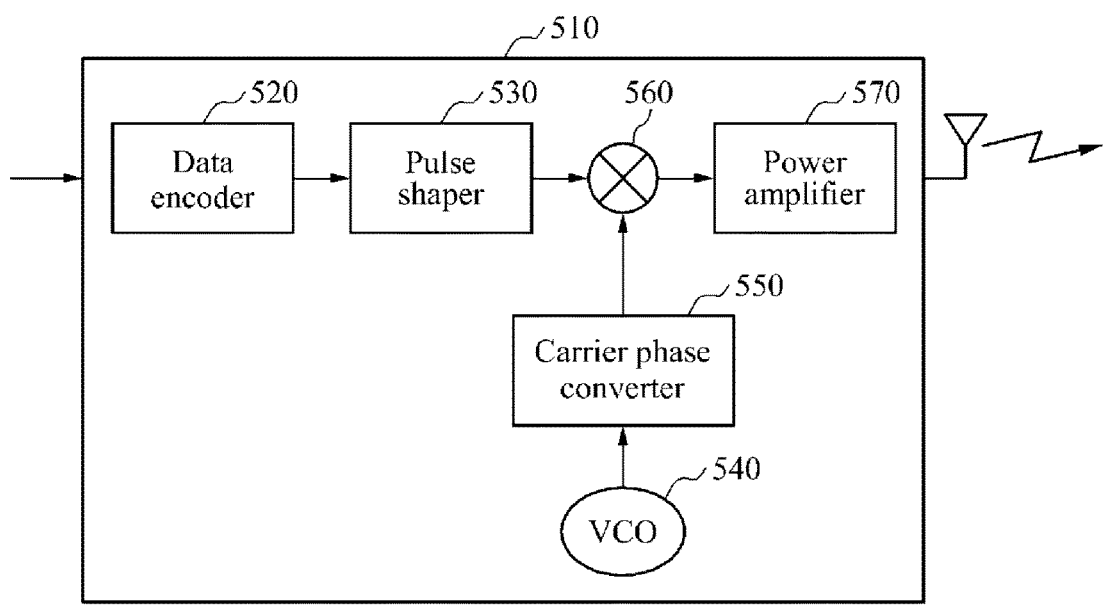
FIG. 5 is a diagram illustrating another example of an operation to transmit an RF signal based on a method to convert a carrier phase, in accord with an illustrative configuration.

FIG. 5 illustrates another example of an operation to transmit an RF signal based on a method to convert a carrier phase, in accord with an illustrative configuration.

A transmitter 510 illustrated in FIG. 5 corresponds to the example of the transmitter 210 of FIG. 2. Accordingly, for any descriptions omitted in FIG. 5, reference may be made to FIG. 2.

Referring to FIG. 5, the transmitter 510 includes a data encoder 520, a pulse shaper 530, a mixer 560, a VCO 540, a carrier phase converter 550, and a power amplifier 570.

The data encoder 520 encodes data to be transmitted in a form of a transmission bit. The data encoder 520 maps input data, or a data sequence, to a predetermined element set. The pulse shaper 530 generates a pulse corresponding to data input based on a result of the mapping performed at the data encoder 520. The pulse shaper 530 multiplies an output value of the data encoder 520 and a predetermined pulse shape, and generates a pulse corresponding to the data. The pulse shaper 530 overlaps pulses corresponding to the data sequence on a time axis, and converts the data sequence to a pulse series.

The VCO 540 generates an RF oscillating signal corresponding to a carrier frequency, and outputs the generated RF oscillating signal.

The carrier phase converter 550 randomly changes a phase of the RF oscillating signal output from the VCO 540. The carrier phase converter 550 generates a random carrier phase, applies the generated carrier phase to an RF oscillating signal, and randomly changes the phase of the RF oscillating signal. The carrier phase converter 550 randomly changes the phase of the RF oscillating signal by applying a function having a predetermined value, in a time interval determined based on a transmission period of a transmission symbol. Also, the carrier phase converter 550 changes the phase of the RF oscillating signal using a plurality of functions. The carrier phase converter 550 controls an operation of an oscillator to output an RF oscillating signal, and changes the phase of the RF oscillating signal to a continuous phase value.

The mixer 560 generates an RF signal corresponding to input data by multiplying the RF oscillating signal, to which the random carrier phase output by the carrier phase converter 550 is applied, and a pulse series of a low frequency band output from the pulse shaper 530. The generated RF signal is transmitted to a receiver through the power amplifier 570.

Figure 6:
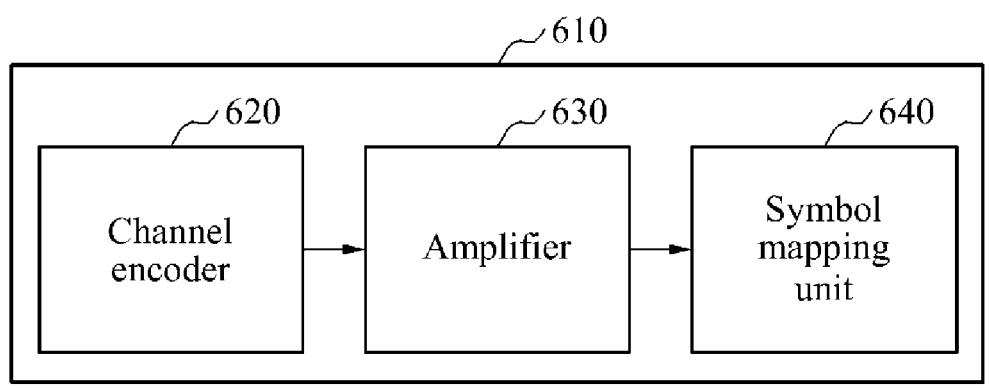
FIG. 6 is a diagram illustrating an example of a detailed configuration of a data encoder, in accord with an illustrative configuration.

FIG. 6 illustrates an example of a detailed configuration of a data encoder 610, in accordance with an illustrative configuration.

When a system for wireless communication including a transmitter and a receiver uses an error correction encoding scheme and a spreading code sequence, the data encoder 230 of FIG. 2 may include the data encoder 620 of FIG. 6. The data encoder 610 of FIG. 6 includes a channel encoder 620 to perform encoding through an error correction code in the input data, a spreader 630 to apply a spreading code sequence to the encoded input data, and a symbol mapping unit 640 to map a predetermined symbol with the encoded input data to which a spreading code sequence is applied.

Figure 7:
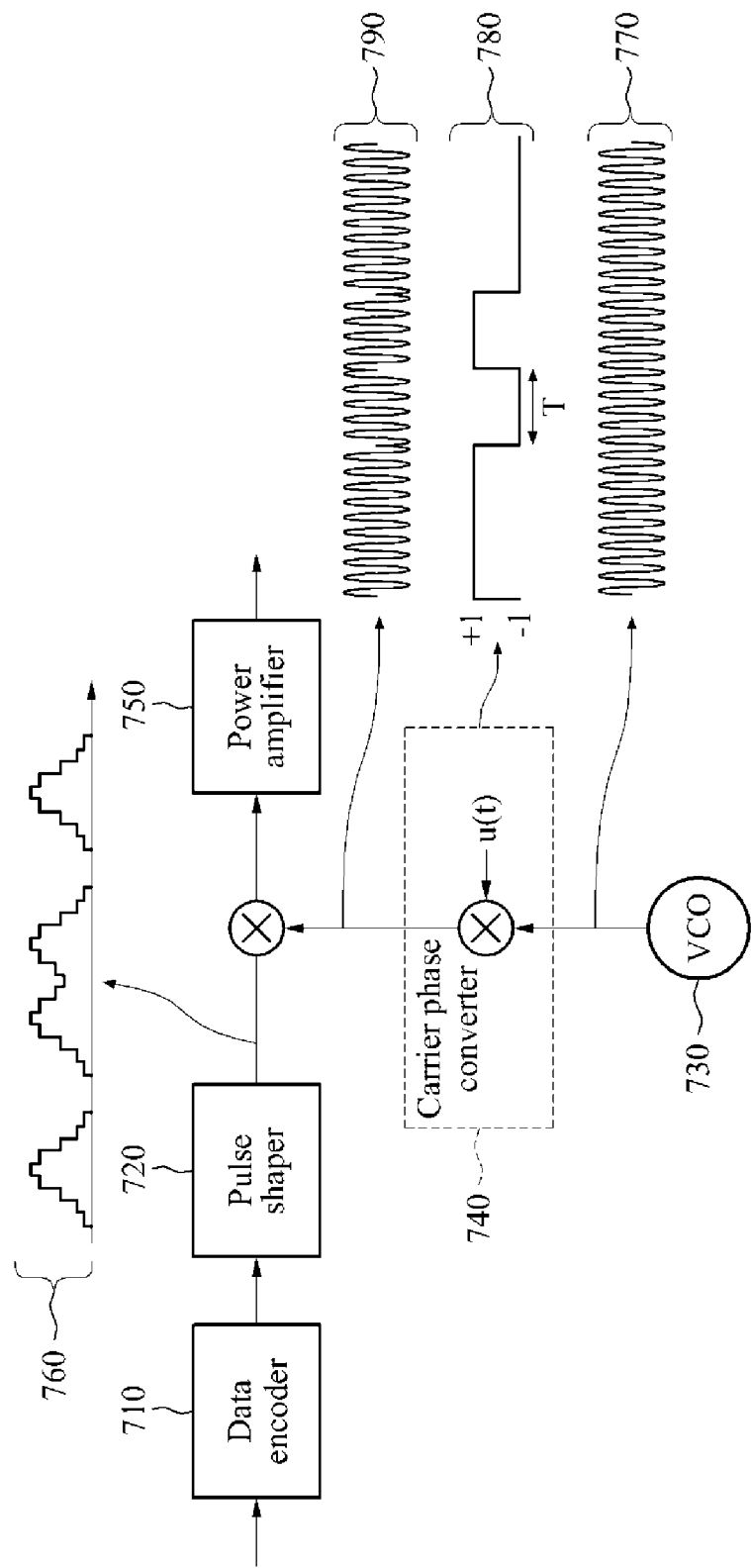
FIG. 7 is a diagram illustrating an example of an operation of the transmitter based on a signal waveform, in accord with an illustrative configuration.

FIG. 7 illustrates an example of an operation of a transmitter based on a signal waveform, in accord with an illustrative configuration.

A data encoder 710, a pulse shaper 720, a VCO 730, a carrier phase converter 740, and a power amplifier 750 of FIG. 7 may correspond to various configurations of FIG. 5. Therefore, for detailed descriptions of operation of configurations of FIG. 7 omitted herein, reference may be to FIG. 5.

The data encoder 710 of FIG. 7 is assumed to be a binary encoder to encode input data to a single element included in an element set {0, 1}. A shape of a pulse output from the pulse shaper 720, which may be a digital pulse shaping filter, may have a shape of a quantized Gaussian pulse. Pulse shaping may refer to adjusting a shape of a pulse, such that the shape of the pulse is not distorted in a limited bandwidth when a transmission waveform corresponding to a predetermined transmission bit is transmitted because a frequency bandwidth of a wireless channel available is limited.

When an output of the data encoder 710 is [1 0 1 1 0 1], an output signal 760 from the pulse shaper 720 has a shape of overlapping pulses corresponding to a plurality of outputs. The carrier phase converter 740 randomly changes a phase of an RF oscillating signal 770 output from the VCO 730 to "0" degrees or 180 degrees. The carrier phase converter 740 applies a function u(t) 780 to the RF oscillating signal 770 from the VCO 730. The function u(t) 780 represents a signal waveform that is randomly changed to +1 or −1 in a time interval. The carrier phase converter 740 is further configured to change a phase of the RF oscillating signal 770 to "0" or 180 degrees at points of time, which correspond to positive integer multiples of a transmission symbol period. An RF oscillating signal 790 of which a phase is randomly converted may bear no relevance to the output of the data encoder 710. Also, information associated with the changed phase may not be shared with a receiver.

The carrier phase converter 740 changes the phase of the RF oscillating signal 770 per transmission symbol period T second, or per positive integer multiple of T second. When bit information corresponding to a binary number is encoded through the data encoder 710, a transmission symbol period T second corresponds to a single bit period. When the data encoder 710 encodes data using a spreading code sequence, the transmission symbol period T second corresponds to a single chip period. The output signal 760 of the pulse shaper 720 and the RF oscillating signal 790 of which the phase is randomly changed by the carrier phase converter 740 is multiplied and wirelessly transmitted via the power amplifier 750.

A mathematical representation of an output signal v(t) of a VCO with respect to a time "t" may be defined as Equation 1.

$$v(t) = \sqrt{2} \cos(2\pi f_c t) \quad \text{[Equation 1]}$$

In this example, $f_c$ denotes a frequency, or a carrier frequency, of an RF oscillating signal.

A mathematical representation of an output signal y(t) of the carrier phase converter 740 shown in FIG. 7 may be expressed as Equation 2.

$$y(t) = u(t)v(t) = \left(u_0 rect\left(\frac{t}{T}\right) + u_1 rect\left(\frac{t-T}{T}\right) + \ldots + u_{N-1} rect\left(\frac{t-(N-1)T}{T}\right)\right)v(t) \quad \text{[Equation 2]}$$

where $u_n \in \{-1, 1\}$

In this example, v(t) denotes an output signal of the VCO 730, and u(t) denotes a function that is changed to +1 or −1 per transmission symbol period T. However, u(t) may change per positive integer multiple of the transmission symbol period T. A "sect" function may be defined as Equation 3.

$$rect(t) = \begin{cases} 1, & -0.5 < t < 0.5 \\ 0, & \text{otherwise} \end{cases} \quad \text{[Equation 3]}$$

An RF signal z(t) generated based on the output signal 760 of the pulse shaper 720 and the output signal of the carrier phase converter 740 may be calculated according to Equation 4.

$$z(t) = p_{seq}(t) \cdot y(t) = p_{seq}(t) \cdot u(t) \cdot \sqrt{2} \cos(2\pi f_c t) \quad \text{[Equation 9]}$$

In this example, $P_{seq}(t)$ denotes a time response function of an overlapping pulse series, and may be represented as Equation 5.

$$p_{seq}(t) = c_0 p(t) + c_1 p(t-T) + \ldots + c_{N-1} p(t-(N-1)T) = \sum_{n=0}^{N-1} c_n p(t-nT) \quad \text{[Equation 5]}$$

In one example, p(t) denotes a time response function with respect to a single pulse, and $c_n$ denotes an output value of the data encoder 710 output for a plurality of symbol periods. For example, when the transmitter uses a noncoherent OOK modulation/demodulation scheme, the output value of the data encoder 710 has a value of "0" or "1".

Figure 13:
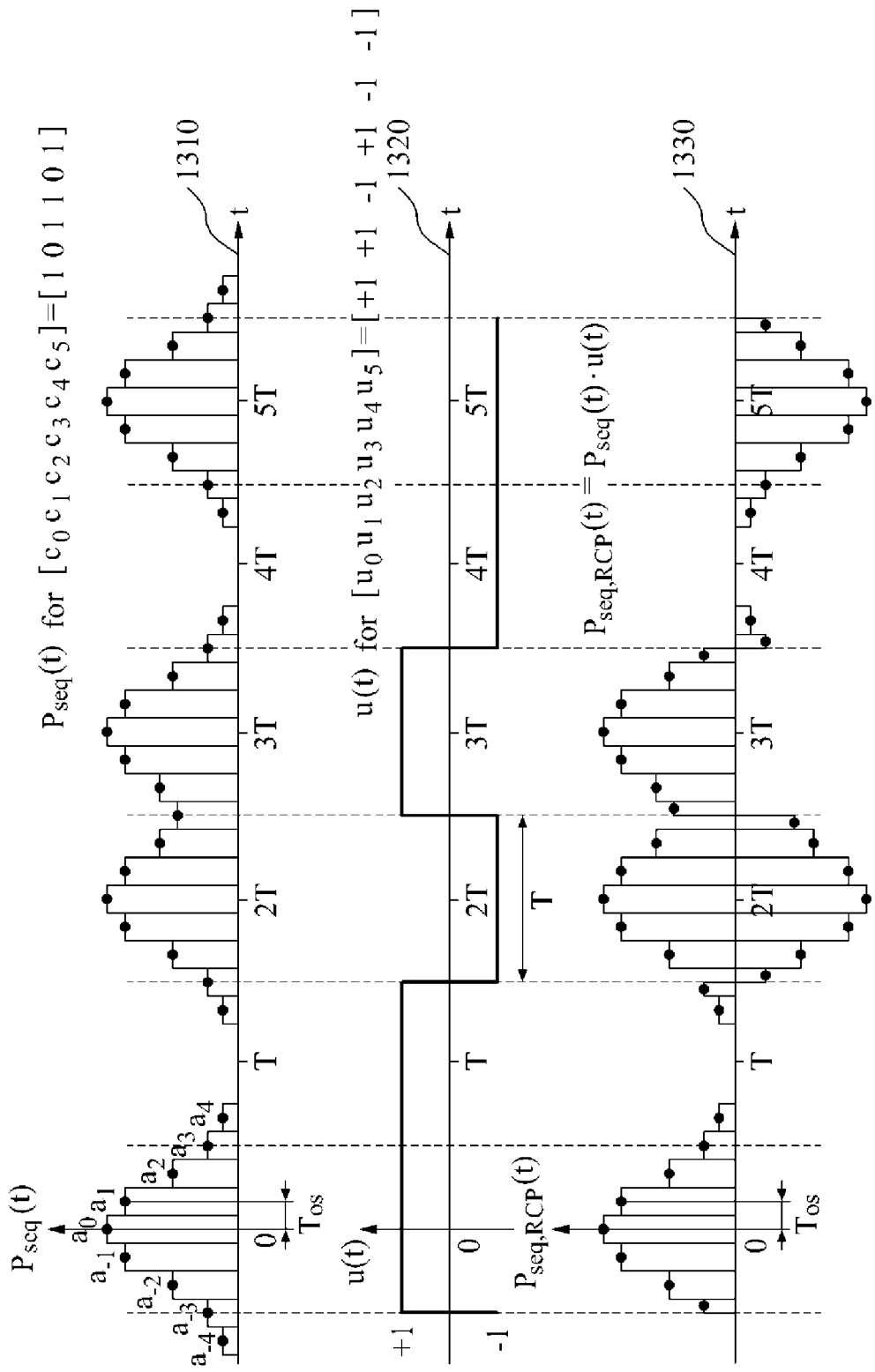
FIG. 13 is a diagram illustrating an example of a low frequency band signal included in an output signal of a power amplifier, in accord with an illustrative configuration.

A low frequency band signal, or a baseband signal, obtained by excluding a high frequency band signal from an output signal of the power amplifier 750 is represented in FIG. 13. FIG. 13 illustrates an example of equivalent baseband signal components of an output signal of a power amplifier. In FIG. 13, a discontinuous quantized Gaussian pulse is applied, and "cn" and u(t) denote [$c_0$ $c_1$ $c_2$ $c_3$ $c_4$ $c_5$]=[1 0 1 1 0 1] and [$u_0$ $u_1$ $u_2$ $u_3$ $u_4$ $u_5$]=[+1 +1 −1 +1 −1 −1], respectively. A graph 1210 illustrates a time response function $P_{seq}(t)$ of an overlapping pulse series, a graph 1220 illustrates a function u(t) changing per transmission symbol period T second or per positive integer multiple of T second, and a graph 1230 illustrates an equivalent baseband signal $P_{seq,RCP}(t)$ included in an output signal of a power amplifier. The equivalent baseband signal $P_{seq,RCP}(t)$ may be represented as $P_{seq}(t) \cdot u(t)$.

Figure 8:
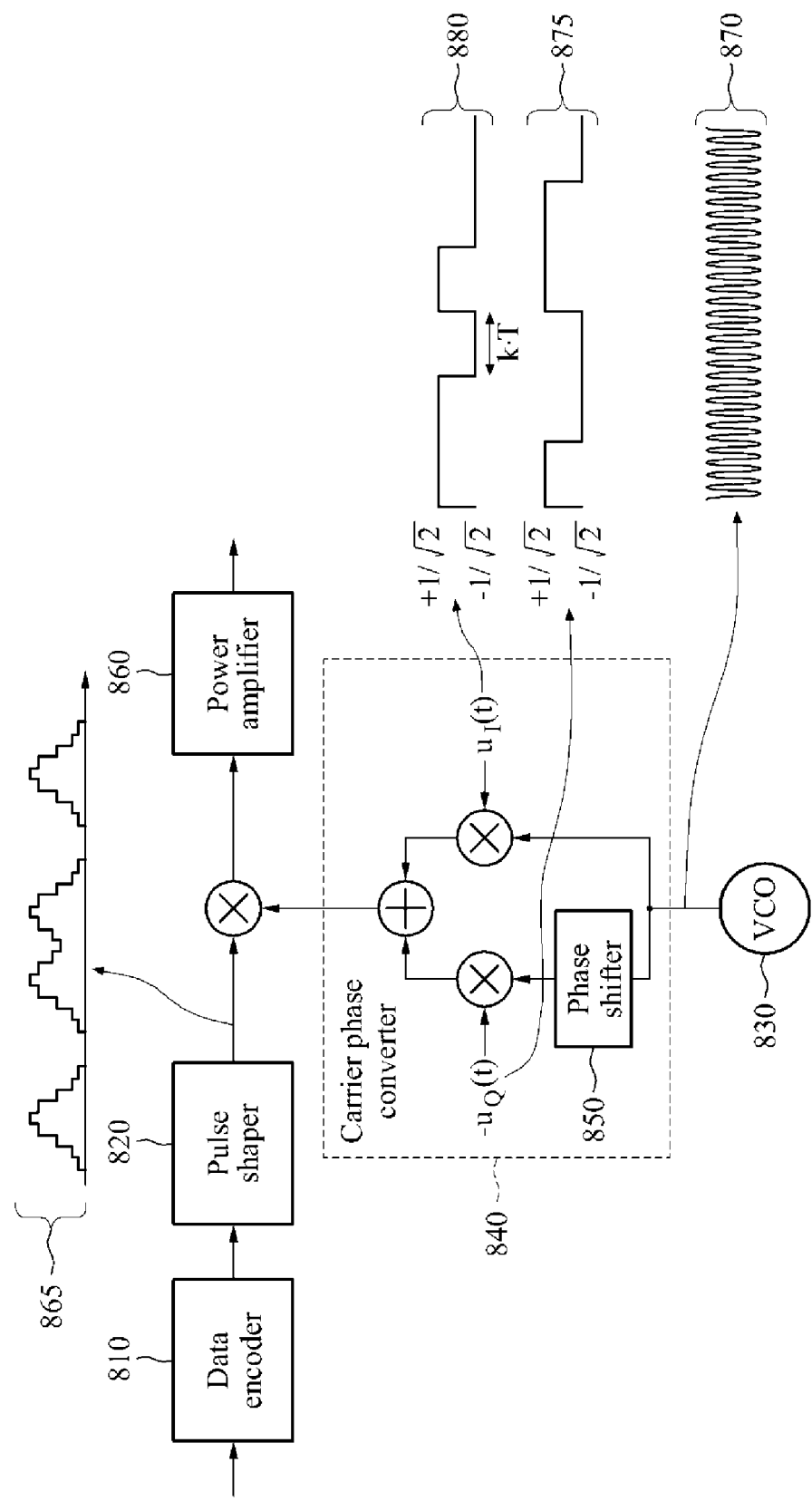
FIG. 8 is a diagram illustrating another example of an operation of the transmitter based on a signal waveform, in accord with an illustrative configuration.

FIG. 8 illustrates another example of an operation of a transmitter based on a signal waveform, in accord with an illustrative configuration.

A data encoder 810, a pulse shaper 820, a VCO 830, a carrier phase converter 840, and a power amplifier 860 illustrated in FIG. 8 may correspond to the plurality of configurations of FIG. 5. Therefore, for any detailed descriptions of operations pertaining to configurations in FIG. 8, reference may be made to FIG. 5. The carrier phase converter 840 includes a phase shifter 850 for moving a phase of an RF oscillating signal 870. For example, the phase shifter 850 moves the phase of the RF oscillating signal 870 by −90 degrees. In FIG. 8, in one configuration, the phase shifter 850 moves the phase of the RF oscillating signal by −90 degrees.

The carrier phase converter 840 of FIG. 8 changes a phase of an RF oscillating signal to a predetermined value divided into an M number of values, unlike the carrier phase converter 740 of FIG. 7. M=4 in FIG. 8, and a shape of a pulse output by the pulse shaper 820 is assumed to correspond to a quantized Gaussian pulse shape. An output signal from the pulse shaper 820 corresponds to a shape of overlapping pulses corresponding to a plurality of outputs when an output of the data encoder 810 is [1 0 1 1 0 1].

For example, the carrier phase converter 840 multiplies an RF oscillating signal output from a VCO and $1/\sqrt{2}$, multiplies an RF oscillating signal of which a phase is moved by −90 degrees and $-1/\sqrt{2}$ by the phase shifter 850, and adds results of the multiplications. A phase of a signal resulting from the addition may be changed to one of $\pi/4$, $3\pi/4$, $5\pi/4$, and $7\pi/4$. For instance, when respective values of $u_f(t)$ 880 and $u_Q(t)$ 875 are $1/\sqrt{2}$ and $-1/\sqrt{2}$, the phase of the RF oscillating signal 870 may be added by $7\pi/4$. In one example, the respective values of $u_I(t)$ 880 and $u_Q(t)$ 875 refer to values that change the phase of the RF oscillating signal to an M number of predetermined differing values, and therefore, $u_I(t)$ 880 and $u_Q(t)$ 875 may not necessarily be $1/\sqrt{2}$ or $-1/\sqrt{2}$. The changed phase of the RF oscillating signal may bear no relevance to an output of the data encoder 810. A pulse signal output from the pulse shaper 820 and the RF oscillating signal, with the phase randomly changed at the carrier phase converter 840, may be multiplied and wirelessly transmitted via the power amplifier 860.

A mathematical representation of an output signal v(t) of the VCO 830 with respect to a time "t" may be expressed as Equation 6.

$$v(t) = \sqrt{2}\cos(2\pi f_c t) \qquad \text{[Equation 6]}$$

In one example, $f_c$ denotes a frequency of the RF oscillating signal 870.

A mathematic representation of an output signal y(t) of the carrier phase converter 840 of FIG. 8 may be simplified as Equation 7.

$$y(t) = u_I(t) \cdot \sqrt{2}\cos(2\pi f_c t) - u_Q(t) \cdot \sqrt{2}\sin(2\pi f_c t) = \qquad \text{[Equation 7]}$$
$$\sqrt{2}\cos(2\pi f_c t + \phi(t))$$

where $$u_I(t) = u_{I,0}\,rect\!\left(\frac{t}{T}\right) +$$
$$u_{I,1}\,rect\!\left(\frac{t-T}{T}\right) + \ldots + u_{I,N-1}\,rect\!\left(\frac{t-(N-1)T}{T}\right),$$
$$u_Q(t) = u_{Q,0}\,rect\!\left(\frac{t}{T}\right) + u_{Q,1}\,rect\!\left(\frac{t-T}{T}\right) + \ldots +$$
$$u_{Q,N-1}\,rect\!\left(\frac{t-(N-1)T}{T}\right),$$
$$\phi(t) = \tan^{-1}\!\left(\frac{u_Q(t)}{u_I(t)}\right), \text{ and } u_{I,n}^2 + u_{Q,n}^2 =$$
$$1 \text{ for } M \text{ elements of } (u_{I,n}, u_{Q,n})$$

In one example, $u_I(t)$ and $u_Q(t)$ denote functions changing based on a relationship of $u_I(t)^2 + u_Q(t)^2 = 1$ per transmission symbol period T. However, $u_I(t)$ and $u_Q(t)$ may change per positive integer multiple of the transmission symbol period T.

An RF signal z(t) generated based on the output signal of the pulse shaper 820 and the output signal of the carrier phase converter 840 may be represented as Equation 8.

$$\begin{aligned}z(t) &= p_{seq}(t) \cdot y(t) \\ &= p_{seq}(t) \cdot \left(u_I(t) \cdot \sqrt{2}\cos(2\pi f_c t) - u_Q(t) \cdot \sqrt{2}\sin(2\pi f_c t)\right) \\ &= p_{seq}(t) \cdot \sqrt{2}\cos(2\pi f_c t + \phi(t))\end{aligned} \qquad \text{[Equation 8]}$$

where $$p_{seq}(t) = c_0 p(t) + c_1 p(t-T) + \ldots + c_{N-1} p(t-(N-1)T) = \sum_{n=0}^{N-1} c_n p(t-nT)$$

In one example, $P_{seq}(t)$ denotes the time response function of the overlapping pulse series of Equation 5, and p(t) denotes a time response function with respect to a single pulse. $c_n$ denotes an output value of the data encoder 810 output for a plurality of symbol periods.

Figure 9:
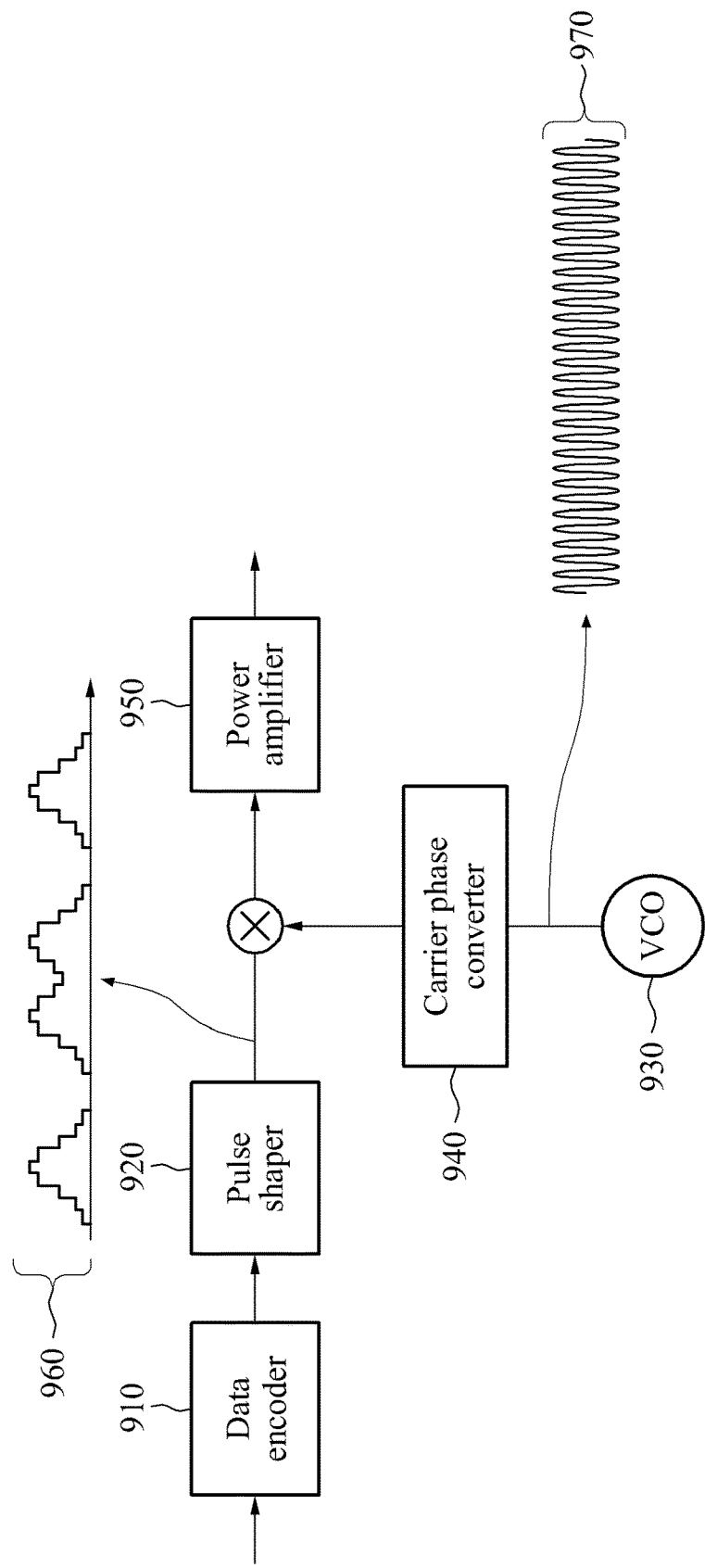
FIG. 9 is a diagram illustrating still another example of an operation of the transmitter based on a signal waveform.

FIG. 9 illustrates still another example of an operation of a transmitter based on a signal waveform, in accord with an illustrative example.

A data encoder 910, a pulse shaper 920, a VCO 930, a carrier phase converter 940, and a power amplifier 950 illustrated in FIG. 9 may correspond to various configurations of FIG. 5. Therefore, for detailed descriptions of operations pertaining to configurations of FIG. 9 omitted herein, reference may be made to FIG. 5.

The carrier phase converter 940 of FIG. 9 controls an operation of the VCO 930, which is an oscillator to output an RF oscillating signal 970, and changes a phase of the RF oscillating signal 970, at random, to a continuous phase value. The carrier phase converter 940 changes the phase of the RF oscillating signal 970 to a predetermined value in a range of "0" degree to 360 degrees. For example, the carrier phase converter 940 turns off and turns on the VCO 930 per predetermined period, and randomly changes the phase of the RF oscillating signal 970 to a continuous phase value in a range of "0" degree to 360 degrees.

As shown in FIGS. 7 and 8, a shape of a pulse output by the pulse shaper 920 is assumed to be a quantized Gaussian pulse shape in FIG. 9. An output signal 960 of the pulse shaper 920 may be in a shape of overlapping pulses corresponding to a plurality of outputs when an output of the data encoder 910 is [1 0 1 1 0 1].

A mathematical representation of an output signal v(t) of a VCO with respect to a time "t" may be defined as Equation 9.

$$v(t) = \sqrt{2}\cos(2\pi f_c t) \qquad \text{[Equation 9]}$$

In one example, G denotes a frequency of an RF oscillating signal.

A mathematical representation of an output signal y(t) of the carrier phase converter 940 of FIG. 9 may be defined as Equation 10.

$$y(t) = \sqrt{2}\cos(2\pi f_c t + \phi(t)) \qquad \text{[Equation 10]}$$

where $$\phi(t) = \phi_0\,rect\!\left(\frac{t}{T}\right) +$$
$$\phi_1\,rect\!\left(\frac{t-T}{T}\right) + \ldots + \phi_{N-1}\,rect\!\left(\frac{t-(N-1)T}{T}\right),$$

and $\phi_n$ is a random variable over the interval $[0, 2\pi]$

In one example, a "rect" function may be represented as Equation 3. $\phi(t)$ denotes a continuous phase value in a range from "0" degree to 360 degrees, for example, $2\pi$. In Equation 10, $\phi(t)$ is assumed to change per transmission symbol period T, however, $\phi(t)$ may change per positive integer multiple of T second.

The RF signal z(t) generated based on the output signal 960 of the pulse shaper 920 and the output signal of the carrier phase converter 940 may be given by Equation 11.

$$z(t) = p_{seq}(t) \cdot y(t) = p_{seq}(t) \cdot \sqrt{2}\cos(2\pi f_c t + \phi(t)) \qquad \text{[Equation 11]}$$

where $$p_{seq}(t) = c_0 p(t) + c_1 p(t-T) + \ldots + c_{N-1} p(t-(N-1)T) =$$
$$\sum_{n=0}^{N-1} c_n p(t-nT)$$

In one illustrative example, $P_{seq}(t)$ denotes a time response function of an overlapping pulse series, and may be simplified as Equation 5. p(t) denotes a time response function with respect to a single pulse, and $c_n$ denotes an output value of a data encoder output for a plurality of symbol periods.

Figure 10:
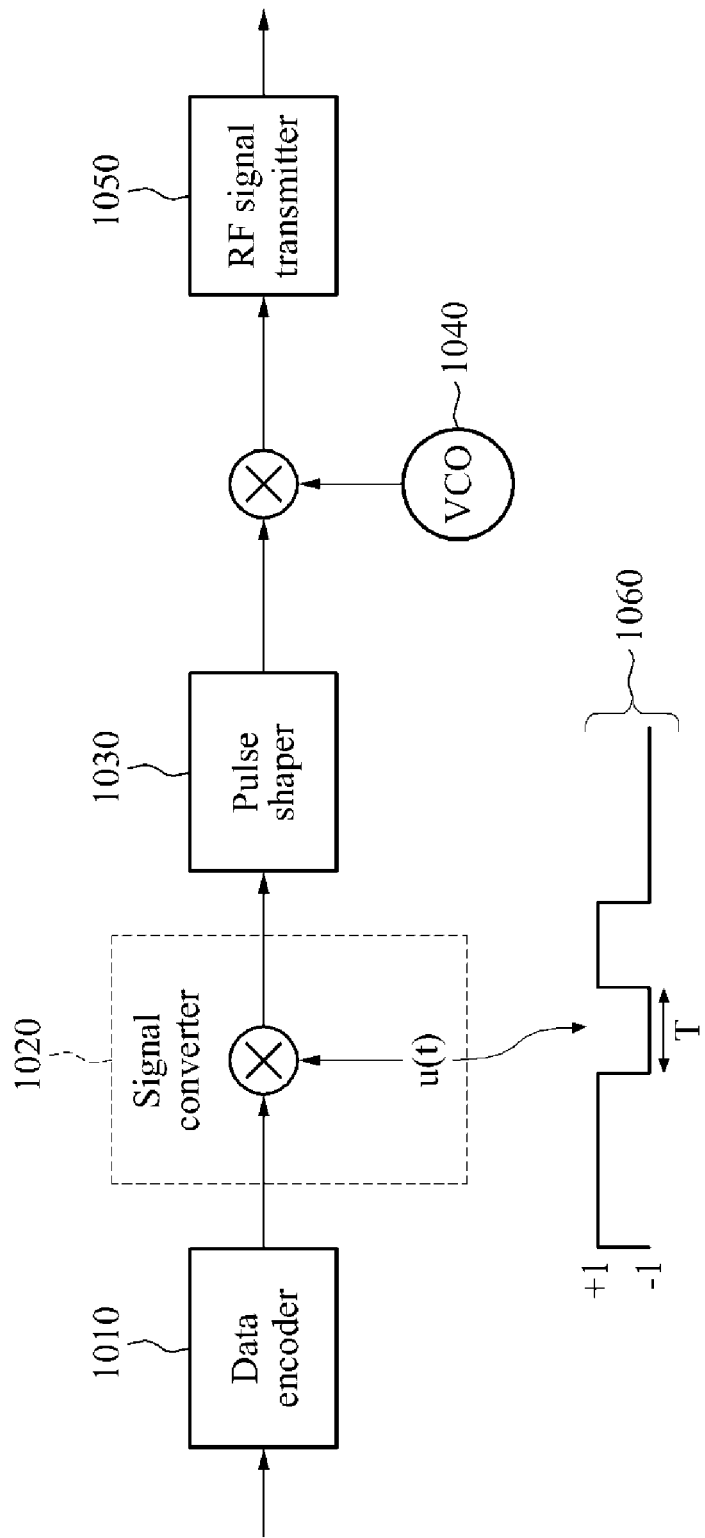
FIG. 10 is a diagram illustrating an example of an operation to transmit an RF signal based on a method to convert a baseband signal.

FIG. 10 illustrates an example of an operation to transmit an RF signal based on a method to convert a baseband signal, in accord with an illustrative configuration.

Referring to FIG. 10, a transmitter may include a data encoder 1010, a signal converter 1020, a pulse shaper 1030, and an RF signal transmitter 1050.

The data encoder 1010 encodes data to be transmitted in a form of a transmission bit. The data encoder 1010 maps input data, or a data sequence, to a predetermined element set, and outputs a quantized result. For example, the predetermined element set may be configured as "0" and predetermined positive numbers greater than "0".

The signal converter 1020 randomly changes a code of the quantized result output from the data encoder 1010. For example, the signal converter 1020 randomly changes a code of a quantized result to a negative value in a time interval determined based on a transmission period of a transmission symbol. The signal converter 1020 applies a function having a random value in the time interval determined based on the transmission period of the transmission symbol to the quantized result, and changes the code of the quantized result. For example, the signal converter 1020 multiplies a function, or a signal waveform u(t) 1060, and the quantized result, and changes the code at random. u(t) 1060 randomly changes per positive integer multiple of the transmission symbol period, and has a negative value. The function u(t) 1060 bears no relevance to an output of the data encoder 1010.

The signal converter 1020 randomly changes the code of the quantized result at points of time corresponding to a positive integer multiple of the transmission period of the transmission symbol. Also, the signal converter 1020 changes the code of the quantized result and a size of the result. The signal converter 1020 adjusts a baseband signal output from the data encoder 1010, and achieves an effect similar to an effect of adjusting a phase of an RF oscillating signal.

The pulse shaper 1030 converts an output signal of the signal converter 1020 to a form of a pulse. The pulse shaper 1030 converts the quantized result of which the code is randomly changed to form the pulse. The pulse shaper 1030 multiplies the output signal of the signal converter 1020 and a predetermined pulse shape, and generates a pulse corresponding to input data. The pulse shaper 1030 overlaps pulses corresponding to a data sequence on a time axis, and converts the data sequence to a form of a series of pulses.

The RF signal transmission unit 1050 converts a pulse to an RF signal, based on an RF oscillating signal, and transmits the RF signal to a receiver. A VCO 1040 outputs an RF oscillating signal, and the RF signal transmission unit 1050 multiplies the RF oscillating signal output from the VCO 1040 and a baseband signal output from the pulse shaper 1030, and generates an RF signal. The RF signal transmission unit 1050 includes a power amplifier (not shown), and an RF signal is wirelessly transmitted via a power amplifier.

Figure 11:
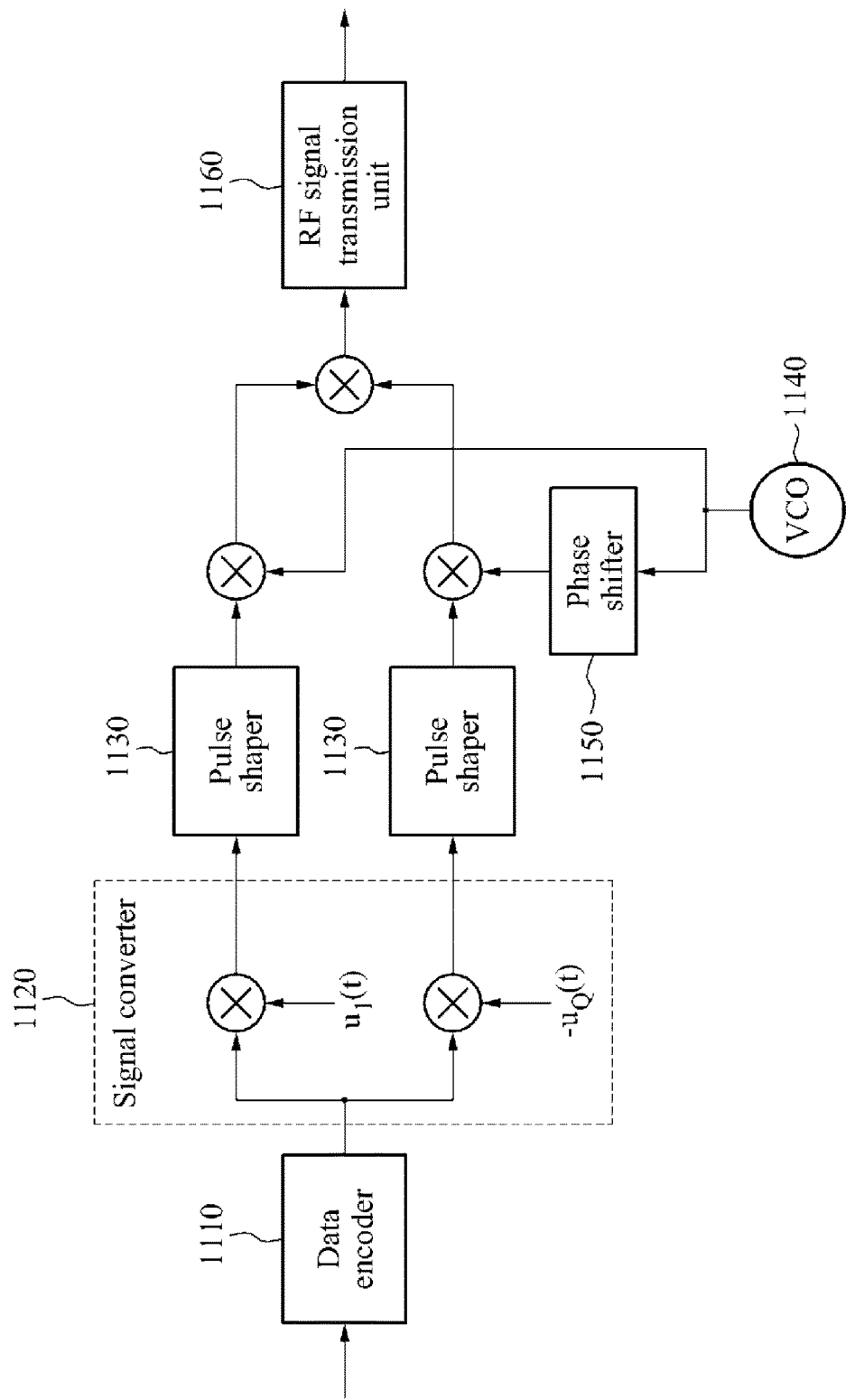
FIG. 11 is a diagram illustrating an example of an operation to transmit an RF signal based on a method to convert a baseband signal.

FIG. 11 illustrates an example of an operation to transmit an RF signal based on a method to convert a baseband signal, in accordance with an illustrative configuration.

A data encoder 1110, a signal converter 1120, at least two pulse shapers 1130, a VCO 1140, and an RF signal transmission unit 1160 of FIG. 11 correspond to the plurality of configurations of FIG. 10. Therefore, for detailed descriptions of operations pertaining to configurations of FIG. 11 omitted herein, reference may be made to FIG. 10. A phase shifter 1150 moves a phase of an RF oscillating signal output from the VCO 1140.

The signal converter 1120 of FIG. 11 outputs to the pulse shaper 1130 a quantized result and a quantized result of which a code is changed at random. The signal converter 1120 randomly represents the code of the quantized result output from the data encoder 1110 ranging from a positive code to a negative code.

For example, the signal converter 1120 uses a function, for example, $u_I(t)$ and $u_Q(t)$, to output both, the quantized result and the quantized result of which the code is randomly changed. Values of (t) and $u_Q(t)$ may have a positive value and a negative value, and may correspond to a value to adjust a phase of an RF oscillating frequency to an M number of differing predetermined values. In this instance, irrespective of an output of the data encoder 1110, the values of (t) and $u_Q(t)$ may be independent, and may change per transmission symbol period or per positive integer multiple of the transmission symbol period. Signals of $u_I(t)$ and $u_Q(t)$ are not be selected from a group having a limited number of quantized components, and may have a predetermined continuous value. The signal converter 1120 adjusts a value of $u_I(t)^2 + u_Q(t)^2$ to maintain a predetermined value, for example, "1".

Figure 12:
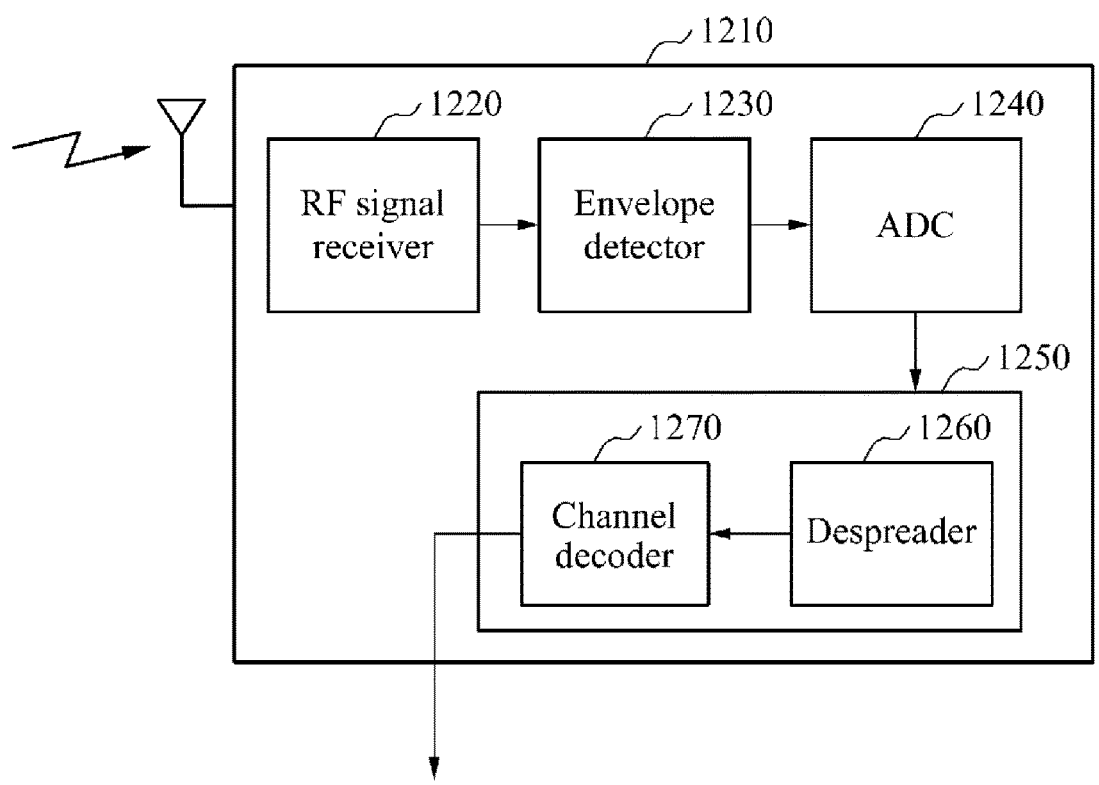
FIG. 12 is a diagram illustrating an example of an operation of the receiver, in accord with an illustrative configuration.

FIG. 12 illustrates an example of an operation of a receiver 1210, in accord with an illustrative example.

Referring to FIG. 12, an RF signal reception unit 1220 receives an RF signal from a transmitter. The RF signal has a carrier phase which is randomly changed at the transmitter. For example, the RF signal corresponds to an RF signal in which a carrier phase is randomly reversed in a time interval determined based on a transmission period of a transmission symbol. An envelope detector 1230 detects an envelope from the received RF signal. In this instance, in a process in which the envelope detector 1230 detects an envelope, an irregular signal due to a random carrier phase may disappear. An analog-to-digital converter (ADC) 1240 performs sampling on the detected envelope, and converts an envelope pattern, for example, from an analog pattern to a digital signal. A data decoder 1250 decodes data, based on the envelope of the RF signal. The data decoder 1250 extracts data using an envelope, and estimates a transmission symbol without using carrier phase information of the RF signal. In a system for wireless communication including the transmitter and the receiver 1210 using an error correction encoding scheme and a spreading code sequence, the data decoder 1250 of the receiver 1210 includes a despreader 1260 and a channel decoder 1270. The despreader 1260 inversely performs an operation of the spreader 630 of FIG. 6 to which a spreading code sequence is applied, and the channel decoder 1270 decodes data in which an error correction code is included performed by the channel encoder 620 of FIG. 6.

Figure 14:
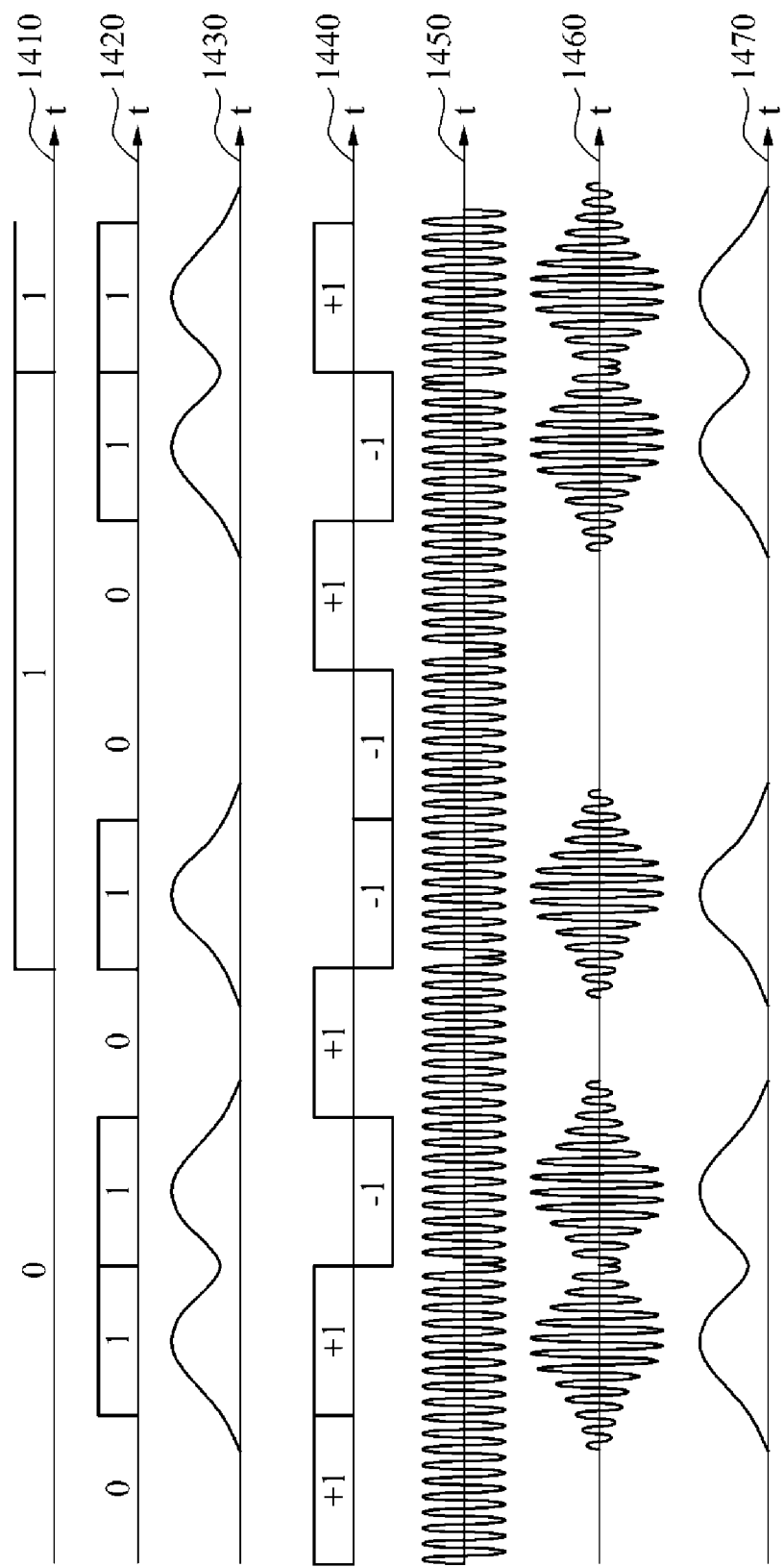
FIG. 14 is a diagram illustrating an example of a method of wireless communication between the transmitter and the receiver based on a signal waveform, in accord with an illustrative configuration.

FIG. 14 illustrates an example of a method of wireless communication between a transmitter and a receiver based on signal waveform, in accord with an illustrative configuration.

A signal 1410 represents a data sequence [0 1 1] to be input to the transmitter. A signal 1420 is an output signal of a data encoder of the transmitter, and represents a signal in which a spreading code sequence is applied to a data sequence. When data input from the signal 1420 is "0", a spreading code sequence [0 1 1 0] may be applied, and when the input data is "1", a spreading code sequence [1 0 0 1] may be applied. The signal 1430 is an output signal of a pulse shaper of the transmitter, and represents a signal with a data sequence to which a spreading code sequence is applied is converted to a form of a pulse. A noncoherent OOK scheme is a scheme in which a pulse is generated when data from a signal 1430 is "1", and a pulse is not generated when the data is "0" is used. A signal 1440 is a signal used for a carrier phase converter of the transmitter to change a phase of an RF oscillating signal, and refers to a function having a random value. The signal 1440 may have a random value of +1 or −1 per transmission symbol period or per positive integer multiple of the transmission symbol period. A signal 1450 is an output signal of the carrier phase converter of the transmitter, and refers to an RF oscillating signal in which the signal 1440 is applied to the RF oscillating signal and a phase is changed. A signal 1460 is an RF signal transmitted from the transmitter, and refers to an RF signal generated by the signal 1450 being applied to the signal 1430. A signal 1470 is an output signal of an envelope detector of the receiver, and refers to a signal as a result of detecting an envelope from an RF signal.

Figure 15:
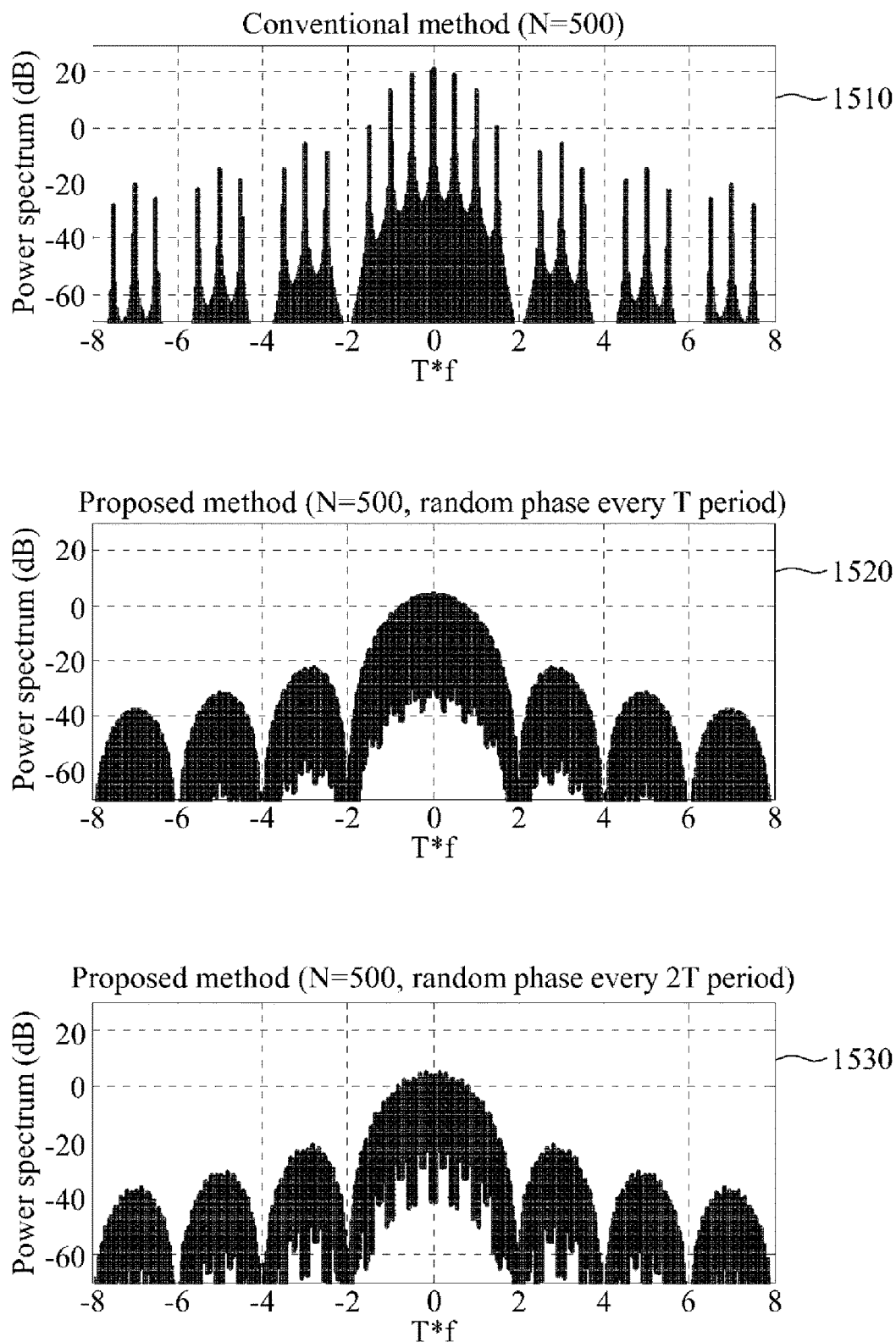

FIGS. 15 and 16 illustrate examples of a simulation result of comparing efficiency of an existing method of wireless communication and efficiency of a proposed method of wireless communication, in accord with an illustrative configuration.

FIG. 15 illustrates a simulation result of estimating frequency power density based on an assumption that an output value $c_n$ of a data encoder to be output for a plurality of symbol periods repeatedly appears in a pattern of "1" and "0", such as in $c_n$=[1, 0, 1, 0, 1, 0, . . . , 1, 0], and "N" corresponding to a length of $c_n$ is 500.

A graph 1510 illustrates the frequency power density based on a conventional method of wireless communication in which a phase of an RF oscillating frequency is not randomly changed. A graph 1520 illustrates the frequency power density when a phase of an RF oscillating frequency is randomly changed per symbol transmission period T. A graph 1530 illustrates the frequency power density when a phase of an RF oscillating frequency is randomly changed per 2T second, for example, two times greater than the symbol transmission period T.

The graph 1510 illustrating the simulation result, according to the conventional method, indicates that line spectrum in which power density is concentrated in a predetermined frequency may occur when the conventional method is used. However, the graphs 1520 and 1530, in which a phase of an RF oscillating frequency is randomly changed and estimated based on a symbol transmission period, indicate that the line spectrum is removed.

FIG. 16 illustrates a simulation result of frequency power density estimated in an environment closer to reality than a simulation environment, in accord with an illustrative configuration.

A graph 1610 illustrates a frequency power density according to the conventional method of wireless communication in which a phase of an RF oscillating frequency is not randomly changed. A graph 1620 illustrates frequency power density when a phase of an RF oscillating frequency is randomly changed per symbol transmission period T second. A detailed simulation environment of FIG. 16 may be represented as Table 1.

TABLE 1

| Notation | RKQT | Description |
|---|---|---|
| $f_{RBW}$ | 100 KHz | Resolution bandwidth |
| T | 1 μs | Symbol duration |

TABLE 1-continued

| Notation | RKQT | Description |
|---|---|---|
| δ | 0.0001 or 0.001 | Sub-interval width of Tf for integration (f: frequency) |
| ρ | 5 or 2 | Interpolation factor for plotting |
| $r$ ($r$ = 0, 1, . . . , $R_{os}$) | $R_{os}$/2 | Truncation factor for integration interval |
| $x_{shift}$ | 0 | Shift value of Tf for the lower limit of the first integration |
| Ω | 50 ohm | Tx impedance |
| $\alpha_i$ ($l$ = 0, 1, . . . , L) | sqrt(PA_out([11 9 4 1]) ×10$^{-3}$ × 50) | Stepwise Gaussian filter coefficients |
| $R_{os}$ | 6 | Tx oversampling rate |
| N | 320 | Number of chip symbols used for obtaining PSD |
| $c_x$ | 1/0 alternating | Tx chip symbol sequence |
| [$c_{-1}, c_M$] | [0, 1] | Outside boundry chip values at both sides of integration interval |

When the graph 1610, according to the conventional method, is compared to the graph 1620 based on a scheme in which a phase of an RF oscillating frequency is randomly changed, power density in a predetermined frequency may be prevented by randomly changing the phase of the RF oscillating frequency.

Figure 17:
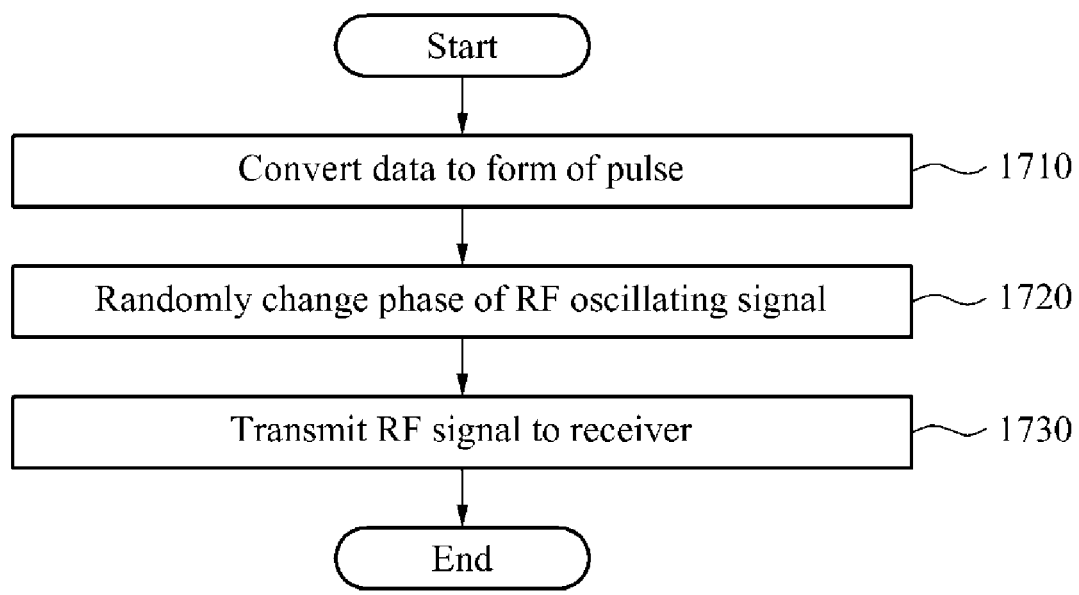
FIG. 17 is a flowchart illustrating an example of a method of wireless communication performed by a transmitter, in accord with an illustrative configuration.

FIG. 17 illustrates an example of a method of wireless communication performed at a transmitter, in accord with an illustrative configuration.

At operation 1710, the method at the transmitter converts input data to a form of a pulse. In other words, the method maps the input data to a predetermined element set, and converts the data to a discrete element. The method generates a pulse corresponding to the data input based on a result of the mapping. The method generates a pulse corresponding to an element, and outputs a pulse sequence represented by a plurality of overlapping pulses.

At operation 1720, the method at the transmitter randomly changes the phase of the RF oscillating signal. For instance, the method generates a random carrier phase, applies the generated random carrier phase to the RF oscillating signal, and randomly changes the phase of the RF oscillating signal. The method applies a function, having a random value in a time interval determined based on a transmission period of a transmission symbol, to an RF oscillating signal, and changes the phase of the RF oscillating signal. The method changes the phase of the RF oscillating signal using a plurality of functions. The method determines a change interval of a phase corresponding to a positive integer multiple of the transmission period of the transmission symbol, and randomly changes the phase of the RF oscillating signal per determined change period.

At operation 1730, the method coverts a pulse to an RF signal, based on the RF oscillating signal of which the phase is converted, and transmits the RF signal to the receiver. The method converts the pulse to the RF signal, based on the RF oscillating signal of which the phase is converted, and transmits the RF signal to the receiver.

Figure 18:
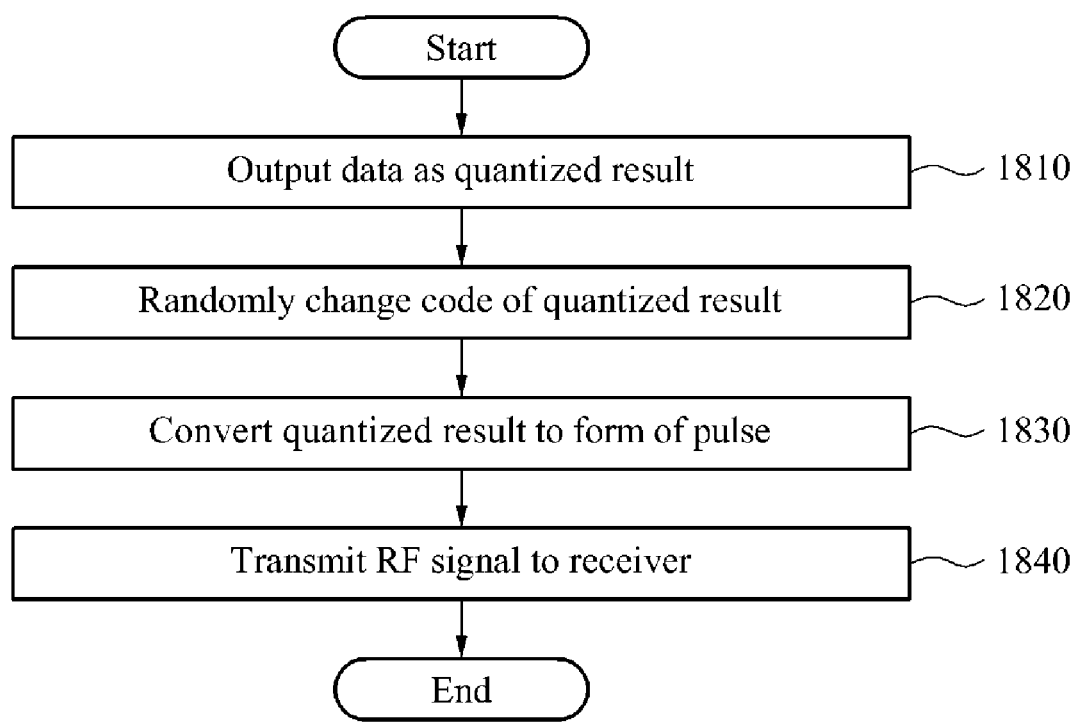
FIG. 18 is a flowchart illustrating an example of a method of wireless communication performed at a transmitter, in accord with an illustrative configuration.

FIG. 18 illustrates an example of a method of wireless communication performed at a transmitter, in accord with an illustrative configuration.

At operation 1810, the method at the transmitter maps data to a predetermined element set, and outputs a quantized result. For example, the element set may be configured to be "0" and predetermined positive numbers greater than "0". The method encodes data to be transmitted in a form of a transmission bit.

At operation 1820, the method randomly changes a code of the quantized result. The method randomly changes the code of the result quantized in a time interval determined based on a transmission period of a transmission symbol to a negative code. The method applies a function having a random value in the time interval determined based on the transmission period of the transmission symbol to the quantized result, and changes the code of the quantized result. The method randomly changes the code of the quantized result at points of time corresponding to a positive integer multiple of the transmission period of the transmission symbol. Also, the method changes the code of the quantized result and a size of the result.

At operation 1830, the method converts the quantized result, of which the code is randomly changed, to a form of a pulse. The method multiplies the quantized result, of which the code is randomly changed, with a predetermined pulse shape, and generates a pulse corresponding to input data. The method overlaps pulses corresponding to a data sequence on a time axis, and converts the data sequence to the form of the pulse.

At operation 1840, the method converts a pulse based on the RF oscillating signal, and transmits the RF signal to a receiver. The method applies the pulse generated at operation 1830 to the RF oscillating signal output, and generates an RF signal. The method wirelessly transmits the generated RF signal to the receiver.

Figure 19:
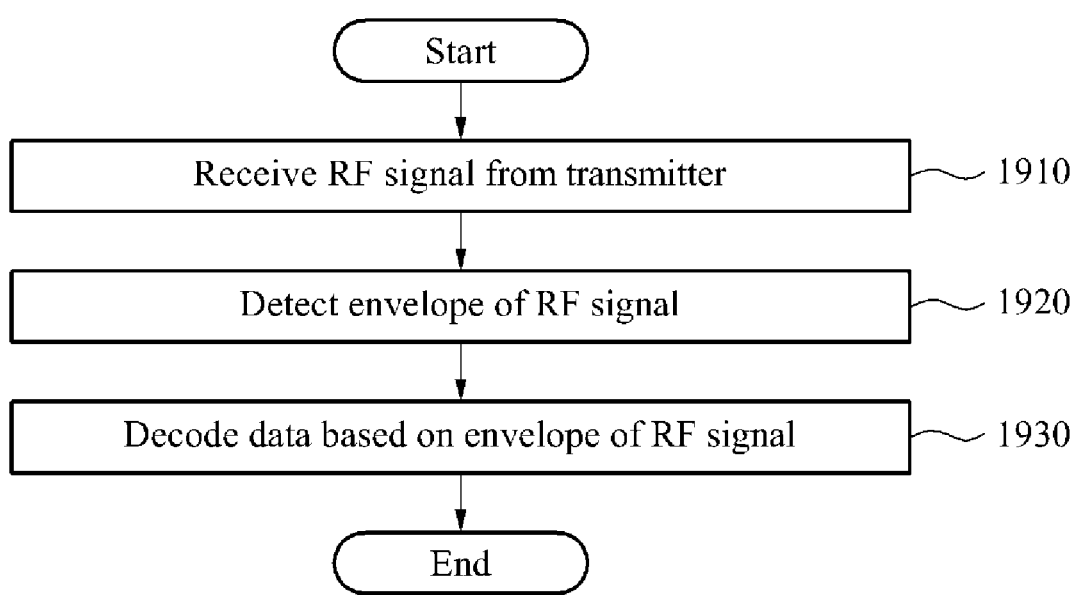
FIG. 19 is a flowchart illustrating an example of a method of wireless communication performed at a receiver, in accord with an illustrative configuration.

FIG. 19 is a flowchart illustrating an example of a method of wireless communication performed by a receiver, in accord with an illustrative configuration.

At operation 1910, the method at the receiver receives an RF signal from a transmitter. The RF signal may have a carrier phase randomly changed at the transmitter. For example, the RF signal is an RF signal of which a carrier phase is randomly reversed in a time interval determined based on a transmission period of a transmission symbol, or an RF signal of which a carrier phase is randomly changed to a predetermined value in the time interval determined based on the transmission period of the transmission symbol. Also, the RF signal may be an RF signal of which a carrier phase is randomly changed to a continuous phase value.

At operation 1920, the method detects an envelope of an RF signal. An irregular signal by a random carrier phase may disappear during a process in which an envelope detector detects an envelope.

At operation 1930, the receiver may decode data, based on the envelope of the RF signal. The method detects the envelope of the RF signal, samples on an envelope pattern, and converts an envelope pattern, for example, an analog signal, to a digital signal. The method extracts data, using the envelope, and estimates a transmission symbol without using carrier phase information of the RF signal.

The units and apparatuses described herein may be implemented using hardware components. The hardware components may include, for example, processors, controllers, transmitters, receivers, devices, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The processes, functions, methods and/or software described above including a method of wireless communication may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network and non-transitory computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of wireless communication, comprising:
  receiving a radio frequency (RF) signal from a transmitter;
  detecting an envelope of the RF signal; and
  decoding data based on the envelope of the RF signal,
  wherein the RF signal comprises any one of a carrier phase randomly reversed in a time interval determined based on a transmission period of a transmission symbol, a carrier phase randomly changed to a predetermined value in the time interval, and a carrier phase randomly changed to a continuous phase value.

2. The method of claim 1, wherein the decoding data based on the envelope of the RF signal comprises:

sampling an envelope pattern, and converting the envelope pattern to a digital signal;
extracting data from the digital signal; and
estimating the transmission symbol from the data.

3. The method of claim 1, further comprising estimating the transmission symbol without using carrier phase information of the RF signal.

4. The method of claim 1, further comprising inversely performing a spreading operation performed by a spreader and decoding data in which an error correction code was included by a channel encoder.

5. A communication apparatus, comprising:
a radio frequency (RF) signal receiver configured to receive a radio frequency (RF) signal;
an envelope detector configured to detect an envelope of the RF signal; and
a data decoder configured to decode data based on the envelope of the RF signal,
wherein the RF signal comprises any one of a carrier phase randomly reversed in a time interval determined based on a transmission period of a transmission symbol, a carrier phase randomly changed to a predetermined value in the time interval, and a carrier phase randomly changed to a continuous phase value.

6. The apparatus of claim 5, further comprising an analog-to-digital converter (ADC) configured to perform sampling on the detected envelope to produce an envelope pattern and to convert the envelope pattern to a digital signal, wherein the data decoder is further configured to extract data from the digital signal and estimate the transmission symbol from the data.

7. The apparatus of claim 5, wherein the data decoder is further configured to estimate the transmission symbol without using carrier phase information of the RF signal.

8. The apparatus of claim 5, wherein the data decoder further comprises a despreader configured to inversely perform a spreading operation performed by a spreader and a channel decoder configured to decode data in which an error correction code was included by a channel encoder.

* * * * *